United States Patent
Campos, II et al.

(10) Patent No.: US 11,470,915 B2
(45) Date of Patent: *Oct. 18, 2022

(54) ARTICLE OF FOOTWEAR HAVING A SOLE STRUCTURE INCLUDING A FLUID-FILLED CHAMBER AND AN OUTSOLE, THE SOLE STRUCTURE, AND METHODS FOR MANUFACTURING

(71) Applicant: NIKE, Inc., Beaverton, OR (US)

(72) Inventors: Fidencio Campos, II, Dallas, OR (US); Benjamin J. Monfils, Portland, OR (US); Lee D. Peyton, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 246 days.

This patent is subject to a terminal disclaimer.

(21) Appl. No.: 16/554,900

(22) Filed: Aug. 29, 2019

(65) Prior Publication Data
US 2019/0380435 A1    Dec. 19, 2019

Related U.S. Application Data

(63) Continuation of application No. 15/676,661, filed on Aug. 14, 2017, now Pat. No. 10,441,029, which is a
(Continued)

(51) Int. Cl.
*A43B 13/20* (2006.01)
*A43B 13/22* (2006.01)
(Continued)

(52) U.S. Cl.
CPC .............. *A43B 13/20* (2013.01); *A43B 13/16* (2013.01); *A43B 13/189* (2013.01);
(Continued)

(58) Field of Classification Search
CPC ..... A43B 13/20; A43B 13/203; A43B 13/206; A43B 13/16; A43B 13/22; A43B 13/223; A43B 13/26
See application file for complete search history.

(56) References Cited

U.S. PATENT DOCUMENTS 2,128,134 A    8/1938  Giusto
3,251,144 A    5/1966  Weitzner
(Continued)

FOREIGN PATENT DOCUMENTS

CN    1262992 A    8/2000
CN    101516223 A    8/2009
(Continued)

OTHER PUBLICATIONS

China National Intellectual Property Administration, Office Action and Search Report issued for Chinese Patent Application No. 201680015964.0, dated Aug. 21, 2019.
(Continued)

*Primary Examiner* — Ted Kavanaugh
(74) *Attorney, Agent, or Firm* — Honigman LLP; Matthew H. Szalach; Jonathan O'Brien

(57) ABSTRACT

The disclosure id directed to an article of footwear including an upper and the sole structure, to the sole structure, and to a method for manufacturing the sole structure and a method for manufacturing the article of footwear. The sole structure includes a fluid-filled chamber and an outsole that at least partially surrounds the chamber.

18 Claims, 23 Drawing Sheets

Related U.S. Application Data continuation of application No. 14/641,789, filed on Mar. 9, 2015, now Pat. No. 9,750,307, which is a continuation-in-part of application No. 13/773,360, filed on Feb. 21, 2013, now Pat. No. 9,420,848.

(51) Int. Cl.
*B29D 35/12* (2010.01)
*A43B 13/16* (2006.01)
*A43B 13/26* (2006.01)
*A43B 13/18* (2006.01)

(52) U.S. Cl.
CPC ............ *A43B 13/206* (2013.01); *A43B 13/22* (2013.01); *A43B 13/223* (2013.01); *A43B 13/26* (2013.01); *B29D 35/122* (2013.01); *B29D 35/128* (2013.01)

(56) References Cited

U.S. PATENT DOCUMENTS

| | | |
|---|---|---|
| 3,974,578 A | 8/1976 | Oettinger et al. |
| 4,245,406 A | 1/1981 | Landay et al. |
| 4,817,304 A | 4/1989 | Parker et al. |
| 5,005,299 A | 4/1991 | Whatley |
| 5,010,662 A | 4/1991 | Dabuzhsky et al. |
| 5,083,361 A | 1/1992 | Rudy |
| 5,245,766 A | 9/1993 | Warren |
| 5,425,184 A | 6/1995 | Lyden et al. |
| 5,440,826 A | 8/1995 | Whatley |
| 5,543,194 A | 8/1996 | Rudy |
| 5,575,969 A | 11/1996 | Yamamori et al. |
| 5,595,004 A | 1/1997 | Lyden et al. |
| 5,685,451 A | 11/1997 | Newby, Sr. |
| D391,750 S | 3/1998 | Santos et al. |
| D391,751 S | 3/1998 | Santos et al. |
| 5,755,001 A | 5/1998 | Potter et al. |
| 5,771,606 A | 6/1998 | Litchfield et al. |
| D395,744 S | 7/1998 | Edington et al. |
| 5,830,553 A | 11/1998 | Huang |
| 5,987,780 A | 11/1999 | Lyden et al. |
| 6,009,637 A | 1/2000 | Pavone |
| 6,026,593 A | 2/2000 | Harmon-Weiss et al. |
| 6,029,962 A | 2/2000 | Shorten et al. |
| 6,119,317 A | 9/2000 | Pfister |
| 6,253,466 B1 | 7/2001 | Harmon-Weiss et al. |
| 6,503,355 B1 | 1/2003 | Anzani et al. |
| 6,665,958 B2 | 12/2003 | Goodwin |
| 6,694,642 B2 | 2/2004 | Turner |
| 6,763,612 B2 | 7/2004 | Stubblefield et al. |
| 6,837,951 B2 | 1/2005 | Rapaport |
| 6,848,201 B2 | 2/2005 | Staffaroni et al. |
| 6,944,973 B2 | 9/2005 | Goodwin |
| 7,082,702 B2 | 8/2006 | Cretinon |
| 7,086,180 B2 | 8/2006 | Dojan et al. |
| 7,132,032 B2 | 11/2006 | Tawney et al. |
| 7,331,124 B2 | 2/2008 | Meschan |
| 7,451,556 B2 | 11/2008 | Harmon-Weiss et al. |
| 7,624,516 B2 | 12/2009 | Meschan |
| 8,181,361 B2 | 5/2012 | Kimura |
| 8,225,533 B2 | 7/2012 | Meschan |
| 8,296,969 B2 | 10/2012 | Granger et al. |
| 9,750,307 B2 * | 9/2017 | Campos, II ............ A43B 13/20 |
| 10,441,029 B2 * | 10/2019 | Campos, II ............ A43B 13/20 |
| 2001/0011427 A1 | 8/2001 | Seydel et al. |
| 2002/0113694 A1 | 8/2002 | Muirhead |
| 2005/0000115 A1 | 1/2005 | Kimura et al. |
| 2005/0132609 A1 | 6/2005 | Dojan et al. |
| 2005/0268492 A1 | 12/2005 | Fuerst |
| 2007/0101611 A1 | 5/2007 | Li |
| 2007/0113426 A1 | 5/2007 | Abadjian et al. |
| 2007/0169376 A1 | 7/2007 | Hatfield et al. |
| 2007/0169379 A1 | 7/2007 | Hazenberg et al. |
| 2007/0240332 A1 | 10/2007 | Ellis |
| 2008/0005929 A1 | 1/2008 | Hardy et al. |
| 2009/0178300 A1 | 7/2009 | Parker |
| 2009/0288312 A1 | 11/2009 | Dua |
| 2009/0293305 A1 | 12/2009 | Pelsue et al. |
| 2010/0263240 A1 | 10/2010 | Shelton et al. |
| 2011/0030240 A1 | 2/2011 | Schmidt |
| 2011/0131831 A1 | 6/2011 | Peyton et al. |
| 2011/0131832 A1 | 6/2011 | Brandt et al. |
| 2011/0203133 A1 | 8/2011 | Peyton |
| 2012/0110876 A1 | 5/2012 | Lubart |
| 2012/0117826 A1 | 5/2012 | Jarvis |
| 2012/0174434 A1 | 7/2012 | Ellis |
| 2012/0260526 A1 | 10/2012 | Smith et al. |
| 2013/0167401 A1 | 7/2013 | Christensen et al. |
| 2014/0230276 A1 | 8/2014 | Campos, II et al. |
| 2015/0173456 A1 | 6/2015 | Rushbrook |

FOREIGN PATENT DOCUMENTS

| | | |
|---|---|---|
| CN | 102892323 A | 1/2013 |
| EP | 0215974 A1 | 4/1987 |
| TW | 551049 U | 9/2003 |
| WO | WO-2014138322 A1 | 9/2014 |

OTHER PUBLICATIONS

State Intellectual Property Office, Office Action and Search Report issued for Chinese Patent Application No. 201480010015.4, dated May 27, 2016 (23 pages).
ROC (Taiwan) Intellectual Property Office, Office Action issued for Taiwanese Patent Application No. 105107254, dated Mar. 23, 2017 (14 pages).
United States Patent and Trademark Office, Non-Final Rejection and List of References as issued for U.S. Appl. No. 14/641,881, dated Jun. 1, 2017 (17 pages).
United States Patent and Trademark Office, Final Rejection issued for U.S. Appl. No. 14/641,881, dated Dec. 29, 2016.
United States Patent and Trademark Office, Office Action for U.S. Appl. No. 14/641,881, dated Aug. 30, 2016.
International Searching Authority, International Search Report and Written Opinion for Application No. PCT/US2016/020459, dated Jun. 20, 2016.
International Searching Authority, International Search Report and Written Opinion for Application No. PCT/US2016/020490, dated Jun. 20, 2016.
International Searching Authority, International Search Report and Written Opinion for Application No. PCT/US2014/017310, dated Jul. 22, 2014.
United States Patent and Trademark Office, Office Action for U.S. Appl. No. 14/641,789, dated Aug. 29, 2016.
United States Patent and Trademark Office, Office Action for U.S. Appl. No. 14/641,789, dated May 9, 2016.
United States Patent and Trademark Office, Office Action for U.S. Appl. No. 14/641,789, dated Dec. 27, 2016.
United States Patent and Trademark Office, Office Action for U.S. Appl. No. 15/676,661, dated Jan. 30, 2019.

* cited by examiner

ARTICLE OF FOOTWEAR HAVING A SOLE STRUCTURE INCLUDING A FLUID-FILLED CHAMBER AND AN OUTSOLE, THE SOLE STRUCTURE, AND METHODS FOR MANUFACTURING

CROSS-REFERENCE TO RELATED APPLICATION

This application is a Continuation of U.S. application Ser. No. 15/676,661, filed Aug. 14, 2017, which is a Continuation of U.S. application Ser. No. 14/641,789, filed Mar. 9, 2015 (now U.S. Pat. No. 9,750,307), which is a Continuation-in-part of U.S. application Ser. No. 13/773,360, filed Feb. 21, 2013 (now U.S. Pat. No. 9,420,848) the disclosures of which are hereby incorporated by reference in their entirety.

FIELD

The disclosure related to a sole structure for an article of footwear, to an article of footwear including the sole structure, and to a method for manufacturing the sole structure.

BACKGROUND

The present disclosure relates generally to an article of footwear having an upper and a sole structure including co-molded fluid-filled chamber and outsole. The disclosure also relates to the sole structure, to a method for manufacturing the sole structure, and to a method for manufacturing the article of footwear having the sole structure.

Conventional articles of athletic footwear include two primary elements, an upper and a sole structure. The upper is generally formed from a plurality of elements (e.g., textiles, foam, leather, synthetic leather) that are stitched or adhesively bonded together to form an interior void for securely and comfortably receiving a foot. The sole structure incorporates multiple layers that are conventionally referred to as a sock liner, a midsole, and an outsole. The sock liner is a thin, compressible member located within the void of the upper and adjacent to a plantar (i.e., lower) surface of the foot to enhance comfort. The midsole is secured to the upper and forms a middle layer of the sole structure that attenuates ground reaction forces (i.e., imparts cushioning) during walking, running, or other ambulatory activities. The outsole forms a ground-contacting element of the footwear and is usually fashioned from a durable and wear-resistant rubber material that includes texturing to impart traction.

The primary material forming many conventional midsoles is a polymer foam, such as polyurethane or ethylvinylacetate. In some articles of footwear, the midsole may also incorporate a fluid-filled chamber that increases durability of the footwear and enhances ground reaction force attenuation of the sole structure. In some footwear configurations, the fluid-filled chamber may be at least partially encapsulated within the polymer foam, as in U.S. Pat. No. 5,755,001 to Potter, et al., U.S. Pat. No. 6,837,951 to Rapaport, and U.S. Pat. No. 7,132,032 to Tawney, et al. In other footwear configurations, the fluid-filled chamber may substantially replace the polymer foam, as in U.S. Pat. No. 7,086,132 to Dojan, et al. In general, the fluid-filled chambers are formed from a polymer material that is sealed and pressurized, but may also be substantially unpressurized or pressurized by an external source. In some configurations, textile or foam tensile members may be located within the chamber, or reinforcing structures may be bonded to an exterior surface of the chamber to impart shape to or retain an intended shape of the chamber.

Fluid-filled chambers suitable for footwear applications may be manufactured through various processes, including a two-film technique, thermoforming, and blow molding. In the two-film technique, two planar sheets of polymer material are bonded together in various locations to form the chamber. In order to pressurize the chamber, a nozzle or needle connected to a fluid pressure source is inserted into a fill inlet formed in the chamber. Following pressurization, the fill inlet is sealed and the nozzle is removed. Thermoforming is similar to the two-film technique, but utilizes a heated mold that forms or otherwise shapes the sheets of polymer material during the manufacturing process. In blow-molding, a molten or otherwise softened elastomeric material in the shape of a tube (i.e., a parison) is placed in a mold having the desired overall shape and configuration of the chamber. The mold has an opening at one location through which pressurized air is provided. The pressurized air induces the liquefied elastomeric material to conform to the shape of the inner surfaces of the mold, thereby forming the chamber, which may then be pressurized.

Manufacture of articles of footwear typically involves ensuring that related parts are in correct location relative to each other. Manufacture of articles of footwear also may involve ensuring that parts do not move when placed during assembly, for example, while adhesive cures and sets. Also, consumers demand products that are attractive, well-constructed, and provide selected properties and characteristics.

Therefore, there exists a need in the art for an article of footwear that provides properties and characteristics sought by a customer.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
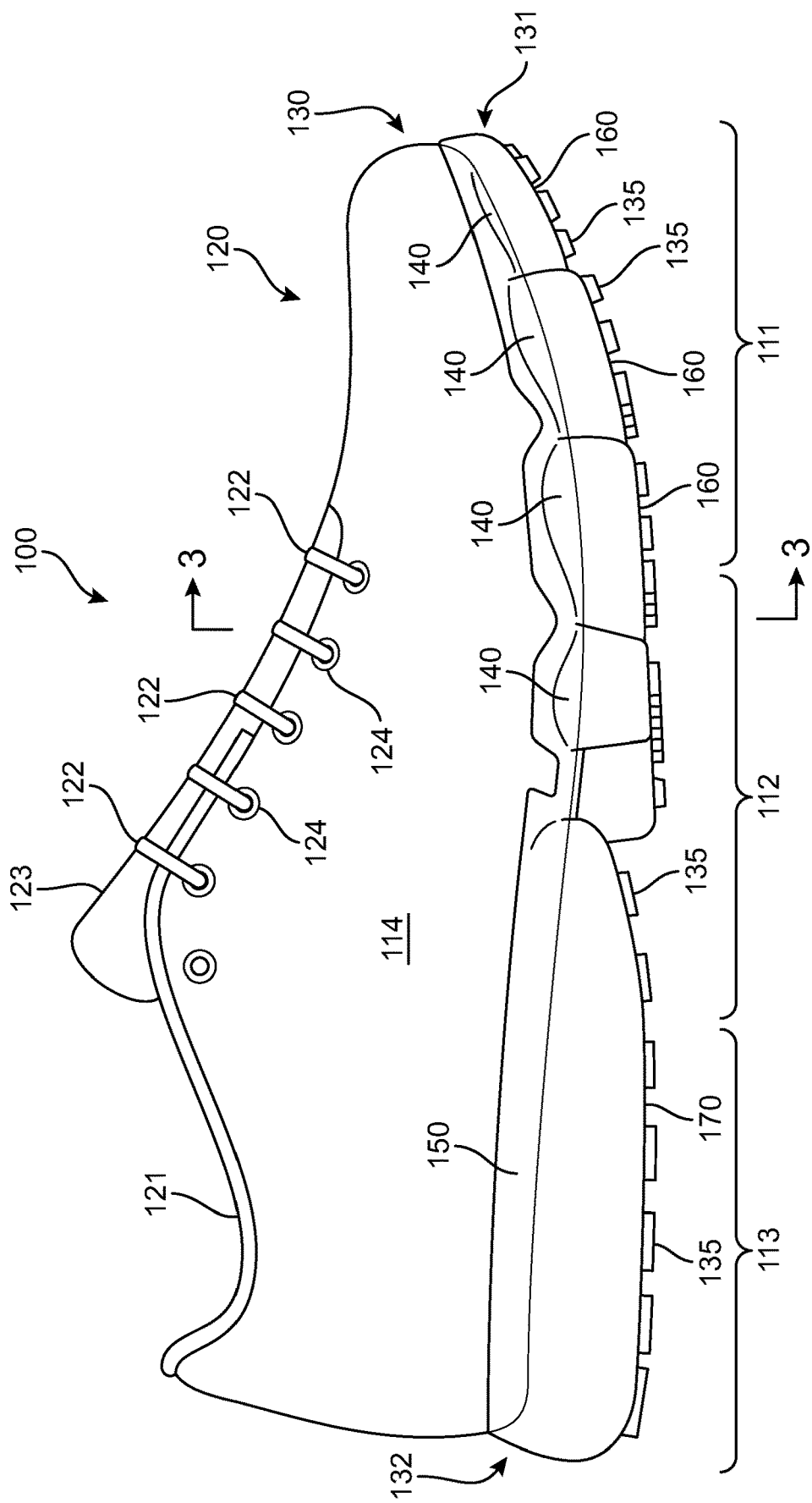
FIG. 1 is a lateral side elevational view of an embodiment of an article of footwear.

The disclosure provides an article of footwear that provides properties and characteristics sought by a customer. Embodiments of the disclosure provide a sole structure for an article of footwear comprising a fluid-filled chamber co-molded with an outsole that at least partially surrounds the chamber. Embodiments of the disclosure also provide an article of footwear including an upper and the sole structure. Embodiments of the disclosure provide a method for manufacturing the sole structure. The disclosure also is directed to a method for manufacturing the article of footwear.

In one aspect, the disclosure relates to a sole structure for article of footwear. The sole structure includes a fluid-filled chamber and an outsole. The fluid-filled chamber has an edge, an upper surface, and a lower surface. The outsole is co-molded to at least a part of the lower surface of the fluid-filled chamber and at least part of the edge of the fluid-filled chamber. The outsole is co-extensive with at least part of the lower surface of the fluid-filled chamber and with at least part of the edge of the fluid-filled chamber.

In another aspect, the disclosure relates to an article of footwear having an upper and a sole structure. The sole structure includes a fluid-filled chamber and an outsole. The fluid-filled chamber has an edge, an upper surface, and a lower surface. The outsole is co-molded to at least a part of the lower surface of the fluid-filled chamber and to at least a part of the edge of the fluid-filled chamber. The outsole is co-extensive with at least part of the lower surface of the fluid-filled chamber and with at least part of the edge of the fluid-filled chamber. At least part of the upper is secured to at least part of the sole structure.

An aspect of the disclosure relates to a method for manufacturing the sole structure comprising a fluid-filled chamber and an outsole. The fluid-filled chamber has an edge, an upper surface, and a lower surface. In accordance with the method, the outsole is located in position in the second portion of a mold having a first mold portion and a second mold portion to contact at least a part of the edge of the chamber and at least a part of the lower surface of the chamber. A fluid-filled chamber precursor is placed in the mold, and the first mold portion and the second mold portion are closed. The upper surface of the fluid-filled chamber is conformed to the shape of the first mold portion, the lower surface of the fluid-filled chamber is conformed to the shape of the second mold portion with the outsole therein, and the edge of the fluid-filled chamber precursor is conformed to the shape of the mold with the outsole therein by a technique selected from the group consisting of drawing a vacuum in the mold, introducing pressure into the fluid-filled chamber precursor, and blends thereof, to form the fluid-filled chamber with the outsole co-molded therewith.

In another aspect, the disclosure relates to a method for minimizing deleterious effects of incomplete bonding caused by gas-related inclusions in the bond between the bonding surface of a fluid-filled chamber and the bonding surface of an outsole. At least one of the bonding surfaces includes a texture having lands and grooves to ensure a bond between the lands and the other surface. The grooves are deeper than the thickness of an adhesive or of a partly molten opposing surface.

In some embodiments, at least part of the upper is secured to at least part of the sole structure.

In some embodiments, at least part of the ground-engaging surface of the outsole is textured.

In some embodiments, the edge of the fluid-filled chamber is flush with the outsole.

In some embodiments, wherein the outsole is adhered to the fluid-filled chamber by partial melting of at least one of the chamber-engaging surface of the outsole, the lower surface of the fluid-filled chamber, and the edge of the fluid-filled chamber.

In some embodiments, the outsole is adhered to the fluid-filled chamber by a layer of adhesive having a thickness.

In some embodiments, the chamber-engaging surface of the outsole is textured, the texture having high areas and low areas having depth, wherein the thickness of the adhesive is less than the depth of the low areas.

In some embodiments, the chamber-engaging surface of the outsole is textured, the texture having high areas and low areas having depth, and the outsole further having gas escape openings.

In some embodiments, the chamber-engaging surface of the outsole is textured, the texture having high areas and low areas having depth, and the outsole further having gas escape openings in fluid communication with gas accumulation areas and passages.

In some embodiments, the chamber-engaging surface of the outsole is textured, the texture having high areas and low areas having depth, and the outsole further having gas escape openings in fluid communication with the low areas.

In other aspects, the disclosure is directed to a method of manufacturing a sole structure for an article of footwear comprising an upper and a sole structure. In accordance with the method, a component including a fluid-filled chamber having an edge, an upper surface, and a lower surface, is provided. An outsole is co-molded to at least a part of the lower surface of the fluid-filled chamber and to at least a part of the edge of the fluid-filled chamber. The outsole is at least partially co-extensive with the lower surface of the chamber and with at least a part of the edge of the chamber, and the outsole has a chamber-engaging surface and a ground-engaging surface.

In some embodiments, the method further comprises locating the outsole in the second portion of a mold having a first mold portion and a second mold portion in position to contact at least a part of the edge of the chamber and at least a part of the lower surface of the chamber. A fluid-filled chamber precursor is placed in the mold, and the first mold portion and the second mold portion are closed.

The upper surface of the fluid-filled chamber is conformed to the shape of the first mold portion, the lower surface of the fluid-filled chamber is conformed to the shape of the second mold portion with the outsole therein, and the edge of the fluid-filled chamber precursor is conformed to the shape of the mold with the outsole therein using a technique selected from the group consisting of drawing a vacuum in the mold, introducing pressure into the fluid-filled chamber precursor, and blends thereof, to form the fluid-filled chamber with the outsole co-molded therewith.

In some embodiments, at least part of the upper is connected to at least part of the sole structure.

In some embodiments, adhesive is applied to the chamber-engaging surface of the outsole before placing the fluid-filled chamber precursor into the mold.

In some embodiments, the adhesive is dried before placing the fluid-filled chamber precursor in the mold.

In some embodiments, the method further comprises co-extruding the outsole with the lower surface of the fluid-filled chamber precursor.

In some embodiments, the method further comprises partially melting at least one of the lower surface of the fluid-filled chamber, the edge of the fluid-filled chamber, and the chamber-engaging surface of the outsole.

In some embodiments, the method further comprises forming a texture on the chamber-engaging surface, the texture having high areas and low areas, and forming gas escape openings in the outsole.

In some embodiments, the chamber-engaging surface of the outsole is textured, the texture having high areas and low areas having depth, and the outsole further has gas escape openings in fluid communication with gas accumulation areas and passages.

In some embodiments, the chamber-engaging surface of the outsole is textured, the texture having high areas and low areas having depth, and the outsole further has gas escape openings in fluid communication with the low areas.

In some embodiments, the edge of the fluid-filled chamber is conformed to the edge of the mold by introducing pressure into the fluid-filled chamber precursor.

In another aspect, the disclosure relates to a method for manufacturing an article of footwear having an upper and a sole structure. In accordance with the disclosure, the method comprises securing at least part of the upper to at least part of the sole structure. The sole structure comprises a fluid-filled chamber having an edge, an upper surface, and a lower surface. The outsole is co-molded to at least a part of the lower surface of the fluid-filled chamber and to at least a part of the edge of the fluid-filled chamber. The outsole is co-extensive with at least part of the lower surface of the fluid-filled chamber and with at least part of the edge of the fluid-filled chamber.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

The disclosure provides an article of footwear that provides properties and characteristics sought by a customer. Embodiments of the disclosure provide a sole structure for an article of footwear comprising a fluid-filled chamber co-molded with an outsole that at least partially surrounds the chamber. Embodiments of the disclosure also provide an article of footwear including an upper and the sole structure. Embodiments of the disclosure provide a method for manufacturing the sole structure. The disclosure also is directed to a method for manufacturing the article of footwear.

The following discussion and accompanying figures disclose various fluid-filled chambers. Concepts related to the chambers are disclosed with reference to footwear that is suitable for running. The chambers are not limited to footwear designed for running, however, and may be utilized with a wide range of athletic footwear styles, including basketball shoes, cross-training shoes, cycling shoes, football shoes, soccer shoes, tennis shoes, and walking shoes, for example. Various configurations of the chambers may be utilized with footwear styles that are generally considered to be non-athletic, including dress shoes, loafers, sandals, and boots. Accordingly, concepts related to the chambers may apply to a wide variety of footwear styles.

General Footwear Structure

Figure 2:
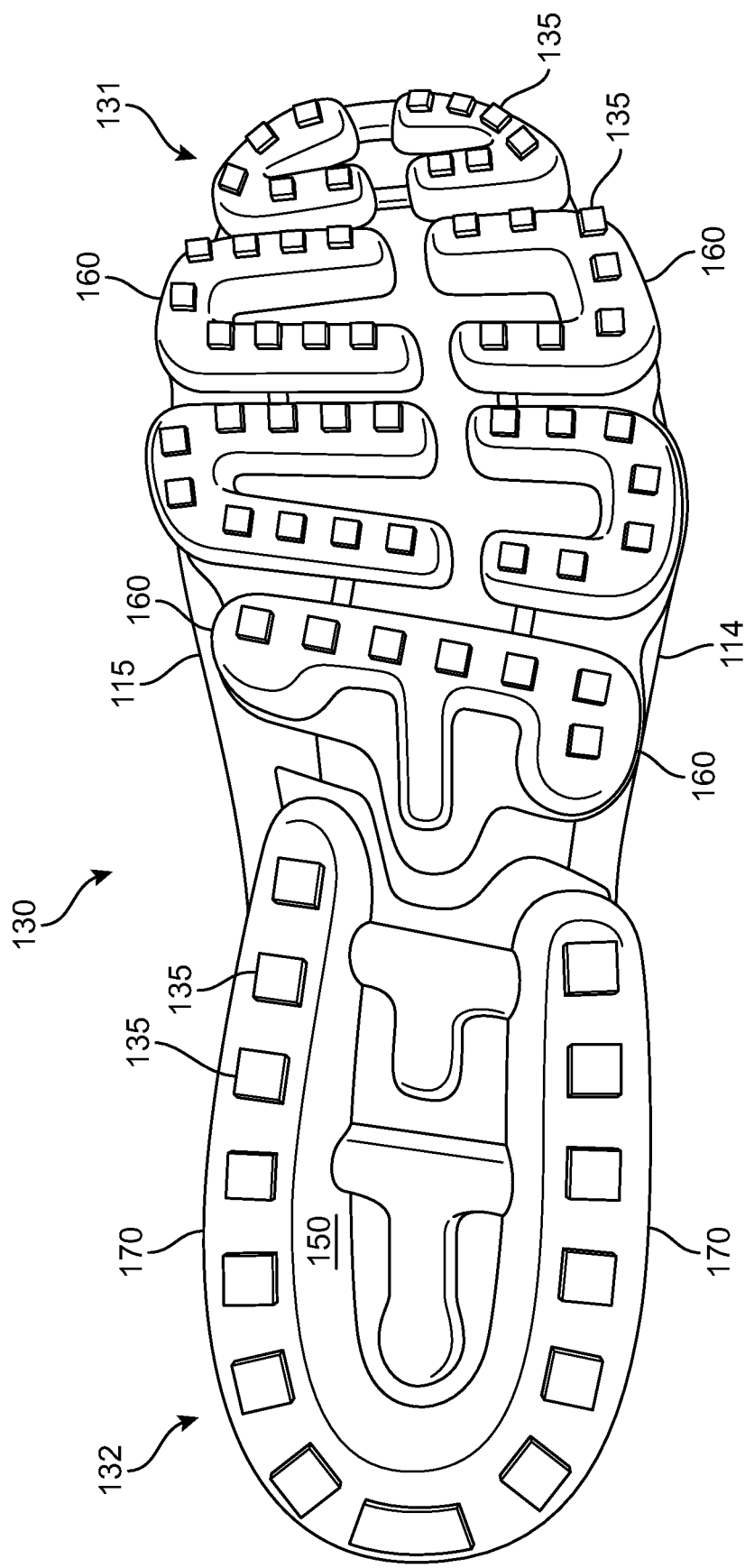
FIG. 2 is a bottom view of the article of footwear.

An article of footwear 100 is depicted in FIG. 1 and FIG. 2 as including an upper 120 and a sole structure 130. Upper 120 provides a comfortable and secure covering for a foot of a wearer. As such, the foot may be located within upper 120 to effectively secure the foot within article of footwear 100 or otherwise unite the foot and article of footwear 100. Sole structure 130 is secured to a lower area of upper 120 and extends between the foot and the ground to attenuate ground reaction forces (i.e., cushion the foot), provide traction, enhance stability, and influence the motions of the foot, for example. In effect, sole structure 130 is located under the foot and supports the foot.

For reference purposes, footwear 100 may be divided into three general regions: a forefoot region 111, a midfoot region 112, and a heel region 113. Forefoot region 111 generally includes portions of article of footwear 100 corresponding with toes of the foot and the joints connecting the metatarsals with the phalanges. Midfoot region 112 generally includes portions of footwear 100 corresponding with an arch area of the foot. Heel region 113 generally corresponds with rear portions of the foot, including the calcaneus bone. Article of footwear 100 also includes a lateral side 114 and a medial side 115, which correspond with opposite sides of article of footwear 100 and extend through each of forefoot region 111, midfoot region 112, and heel region 113. More particularly, lateral side 114 corresponds with an outside area of the foot (i.e. the surface that faces away from the other foot), and medial side 115 corresponds with an inside area of the foot (i.e., the surface that faces toward the other foot). Forefoot regions 111, midfoot region 112, heel region 113, lateral side 114, and medial side 115 are not intended to demarcate precise areas of footwear 100. Rather, forefoot region 111, midfoot region 112, heel region 113, lateral side 114, and medial side 115 are intended to represent general areas of footwear 100 to aid in the following discussion. The characterizations of forefoot region 111, midfoot region 112, heel region 113, lateral side 114, and medial side 115 may be applied to article of footwear 100, and also may be applied to upper 120, sole structure 130, forefoot structure 131, heel structure 132, and individual elements thereof.

Upper 120 is depicted as having a substantially conventional configuration. A majority of upper 120 incorporates various material elements (e.g., textiles, foam, leather, and synthetic leather) that are stitched or adhesively bonded together to form an interior void for securely and comfortably receiving a foot. The material elements may be selected and located in upper 120 to selectively impart properties of durability, air-permeability, wear-resistance, flexibility, and comfort, for example. The void in upper 120 is shaped to accommodate the foot. When the foot is located within the void, therefore, upper 120 extends along a lateral side of the foot, along a medial side of the foot, over the foot, around the heel, and under the foot. An ankle opening 121 in heel region 113 provides the foot with access to the void. A lace 122 extends over a tongue 123 and through various lace apertures 124 or other lace-receiving elements in upper 120. Lace 122 and the adjustability provided by tongue 123 may be utilized in a conventional manner to modify the dimensions of ankle opening 121 and the interior void, thereby securing the foot within the interior void and facilitating entry and removal of the foot from the interior void.

Further configurations of upper 120 may also include one or more of (a) a toe guard positioned in forefoot region 111 and formed of a wear-resistant material, (b) a heel counter located in heel region 113 for enhancing stability, and (c) logos, trademarks, and placards with care instructions and material information. Given that various aspects of the present discussion primarily relate to sole structure 130, upper 120 may exhibit the general configuration discussed above or the general configuration of practically any other conventional or non-conventional upper. Accordingly, the structure of upper 120 may vary significantly within the scope of the present disclosure.

Sole Structure

The primary elements of sole structure 130 are a forefoot sole structure 131 including a forefoot component 140 and a forefoot outsole 160, and a heel sole structure including a heel component 150 and a heel outsole 170. In some embodiments, each of forefoot component 140 and heel component 150 may be directly secured to a lower area of upper 120. Forefoot component 140 and heel component 150 are formed from a polymer material that encloses a fluid, which may be a gas, liquid, or gel. During walking and running, for example, forefoot component 140 and heel component 150 may compress between the foot and the ground, thereby attenuating ground reaction forces. That is, forefoot component 140 and heel component 150 are inflated and generally pressurized with the fluid to cushion the foot.

In some configurations, sole structure 130 may include a foam layer, for example, that extends between upper 120 and one or both of forefoot component 140 and heel component 150, or a foam element may be located within indentations in the lower areas of forefoot component 140 and heel component 150. In other configurations, forefoot sole structure 131 may incorporate plates, moderators, lasting elements, or motion control members that further attenuate forces, enhance stability, or influence the motions of the foot. Heel sole structure 132 also may include such members to further attenuate forces, enhance stability, or influence the motions of the foot.

In addition to providing a wear surface in article of footwear 100, forefoot outsole 160 and heel outsole 170 may enhance various properties and characteristics of sole structure 130. Properties and characteristics of the outsoles, such as the thickness, flexibility, the properties and characteristics of the material used to make the outsole, and stretch, may be varied or selected to modify or otherwise tune the cushioning response, compressibility, flexibility, and other properties and characteristics of sole structure 130. Reinforcement of the outsole (for example, inclusion of structural elements, such as ribs), apertures, the height of the overlap, the number and location of the edges that overlap, or other features of an outsole all may be used to tune the responses of the sole structure. An outsole also may incorporate tread elements, such as protrusions, ridges, or ground-engaging lugs or sections, that impart traction. In some embodiments, an outsole may be replaced by a plate or other structural element. A plate may have features that assist with securing an outsole or other element to heel component 150.

In particular, overlap of a portion of an outsole away from the ground-engaging portion and up the edge of a forefoot component or a heel component may be used to tune the elastic response and cushioning response of the resultant sole structure. With the guidance provided herein, these and other properties and characteristics of the outsole may be considered by the user in combination with the properties and characteristics of the fluid-filled components of the components to adjust the responses of a sole structure.

Sole structure 130 may be translucent or transparent, and may be colored or patterned for aesthetic appeal.

Forefoot outsole 160 is secured to lower areas of forefoot component 140. In some embodiments, forefoot sole structure 131 may extend into midfoot region 112. The forefoot outsole 160 also may be secured to lower areas of forefoot component 140 in midfoot region 112. Heel outsole 170 is secured to lower areas of heel component 150. Both heel component 150 and heel outsole 170 may extend into midfoot region 112. Forefoot outsole 160 and heel outsole 170 may be formed from a wear-resistant material. The wear-resistant material may be transparent or translucent to provide a visually appealing effect. The wear-resistant material may be textured on the ground-engaging portions to impart traction. In some embodiments, the wear-resistant material may have ground-engaging lugs or portions 135, as illustrated in FIG. 1 and FIG. 2.

Figure 3:
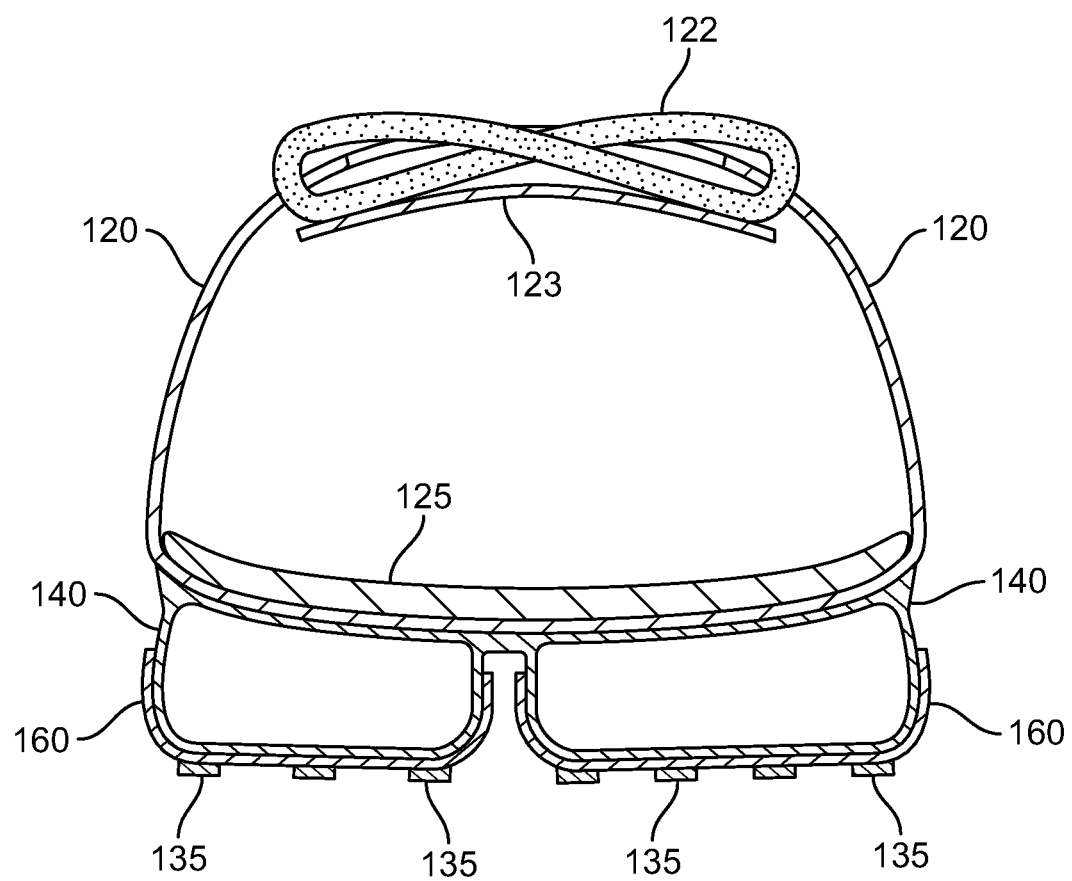
FIG. 3 is a cross-sectional view of the article of footwear of FIG. 2.

FIG. 3 illustrates a cross-sectional view of article of footwear 100 at section line 3-3 with forefoot sole structure 131, including forefoot component 140 and forefoot outsole 160 with ground-engaging lugs 135. As depicted in FIG. 3, upper 120 also includes a sock-liner 125 that is located within the void and positioned to extend under a lower surface of the foot to enhance the comfort of article of footwear 100.

Figure 4:
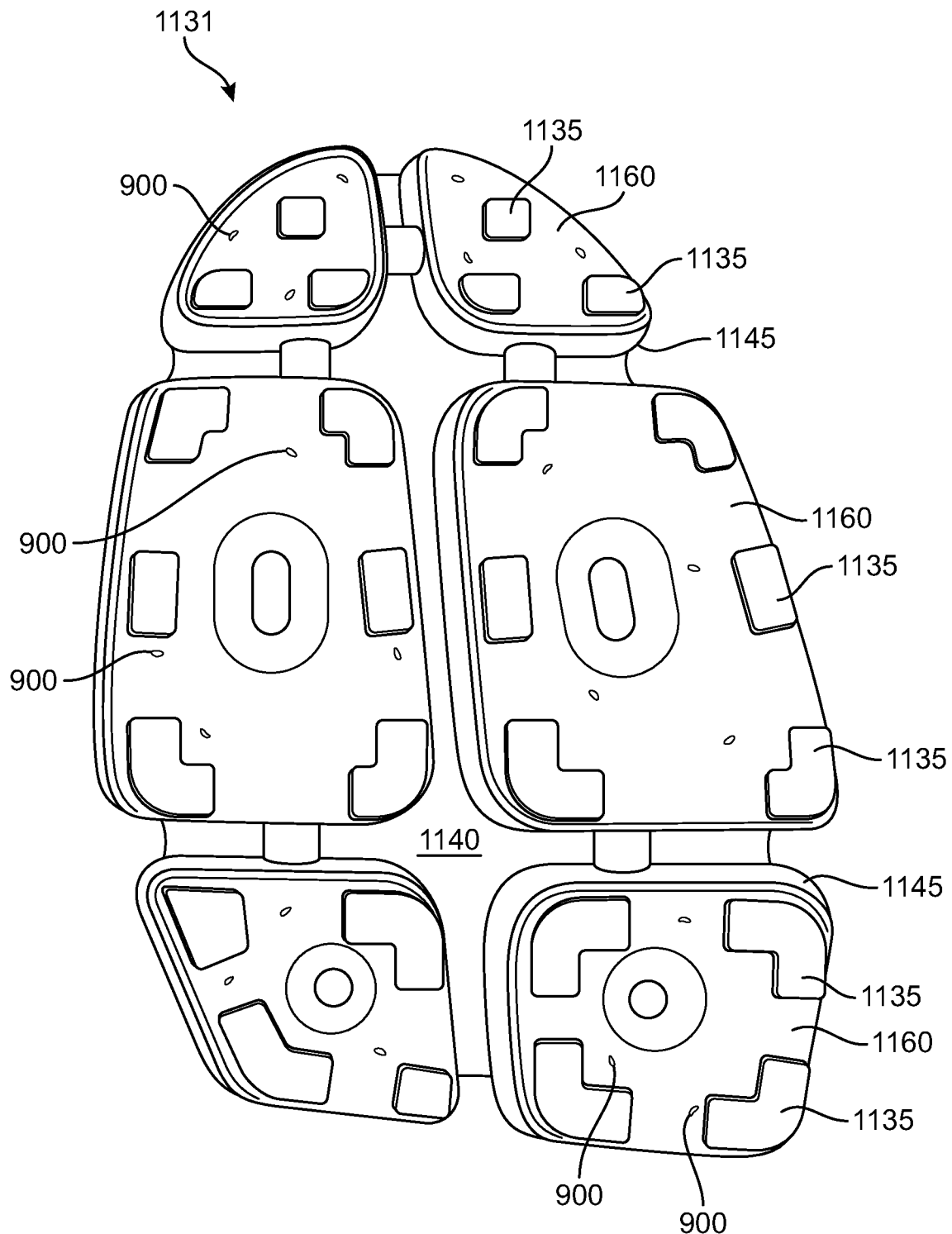
FIG. 4 is a bottom view of a forefoot sole structure of an article of footwear.

FIG. 4 illustrates a bottom view of another embodiment of forefoot sole structure 1131 including forefoot component 1140 and forefoot outsole 1160 with ground-engaging lugs 1135 associated therewith. Forefoot component 1140 is directly secured to a lower area of upper 120 and is formed from a polymer material that encloses a fluid, which may be a gas, liquid, or gel. Forefoot component 1140 may extend into midfoot region 112. Forefoot component 1140 may compress between the foot and the ground, thereby attenuating ground reaction forces. Fluid-filled chambers 1145 of forefoot component 1140 may be inflated and generally pressurized with a fluid to cushion the foot.

Forefoot outsole 1160, which also may extend into midfoot region 112, is secured to lower areas of forefoot component 1140. Forefoot outsole 1160 may include individual portions that cover individual lower areas of fluid-filled chambers 1145 of forefoot component 1140. Forefoot outsole 1160 may be formed from wear-resistant material and, in come embodiments, may include ground-engaging portions or lugs 1135. Forefoot outsole 1160 may be transparent or translucent, and, in some embodiments, may be textured to improve traction.

Figure 5:
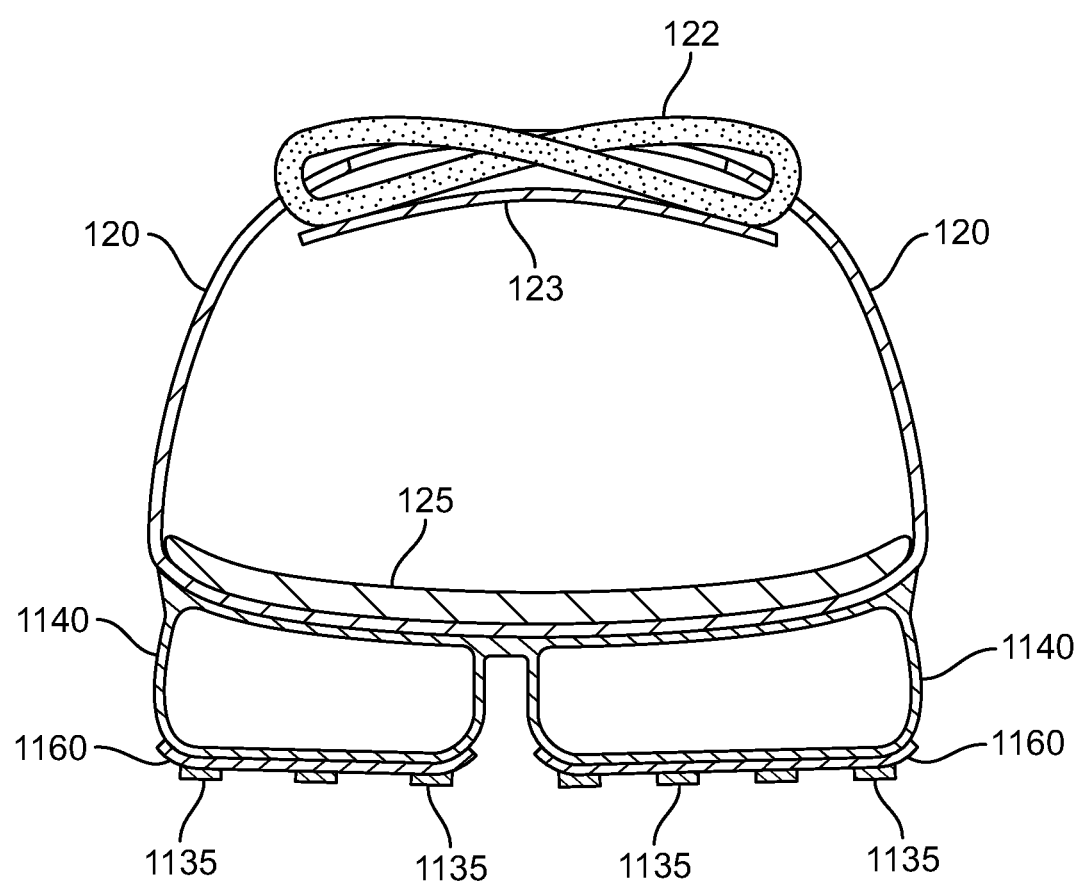
FIG. 5 is a cross-sectional view of an article of footwear having a forefoot sole structure of FIG. 4.

FIG. 5 illustrates a cross-sectional view of an article of footwear 100 at section line 3-3 for another embodiment of forefoot sole structure 1130 including forefoot component 1140 and forefoot outsole 1160. Upper 120 includes laces 122, tongue 123, and sock-liner 125.

Forefoot component 140 and heel component 150 are formed from a polymer material that defines an upper surface, a lower surface, and an edge. Forefoot component 140 may include a plurality of forefoot component fluid-filled chambers 145 (e.g., segments) and heel component 150 may include a plurality of fluid-filled chambers 155 (e.g., segments), each of which may include a plurality of portions and be in fluid communication with at least one other chamber of the component. Upper surface 141 of forefoot component 140 is facing downward so that the forefoot component lower surface 142 and forefoot component edge 143 of each forefoot component fluid-filled chamber 145 are clearly visible in FIG. 7. Similarly, upper surface 1141 of forefoot component 1140 is facing downward so that the forefoot component lower surface 1142 and forefoot component edge 1143 of each forefoot component fluid-filled chamber 1145 are clearly visible in FIG. 9. Heel component fluid-filled chamber 155, heel component upper surface 151, heel component lower surface 152, and heel component edge 153 of heel component 150 are illustrated in FIG. 8.

Figure 6:
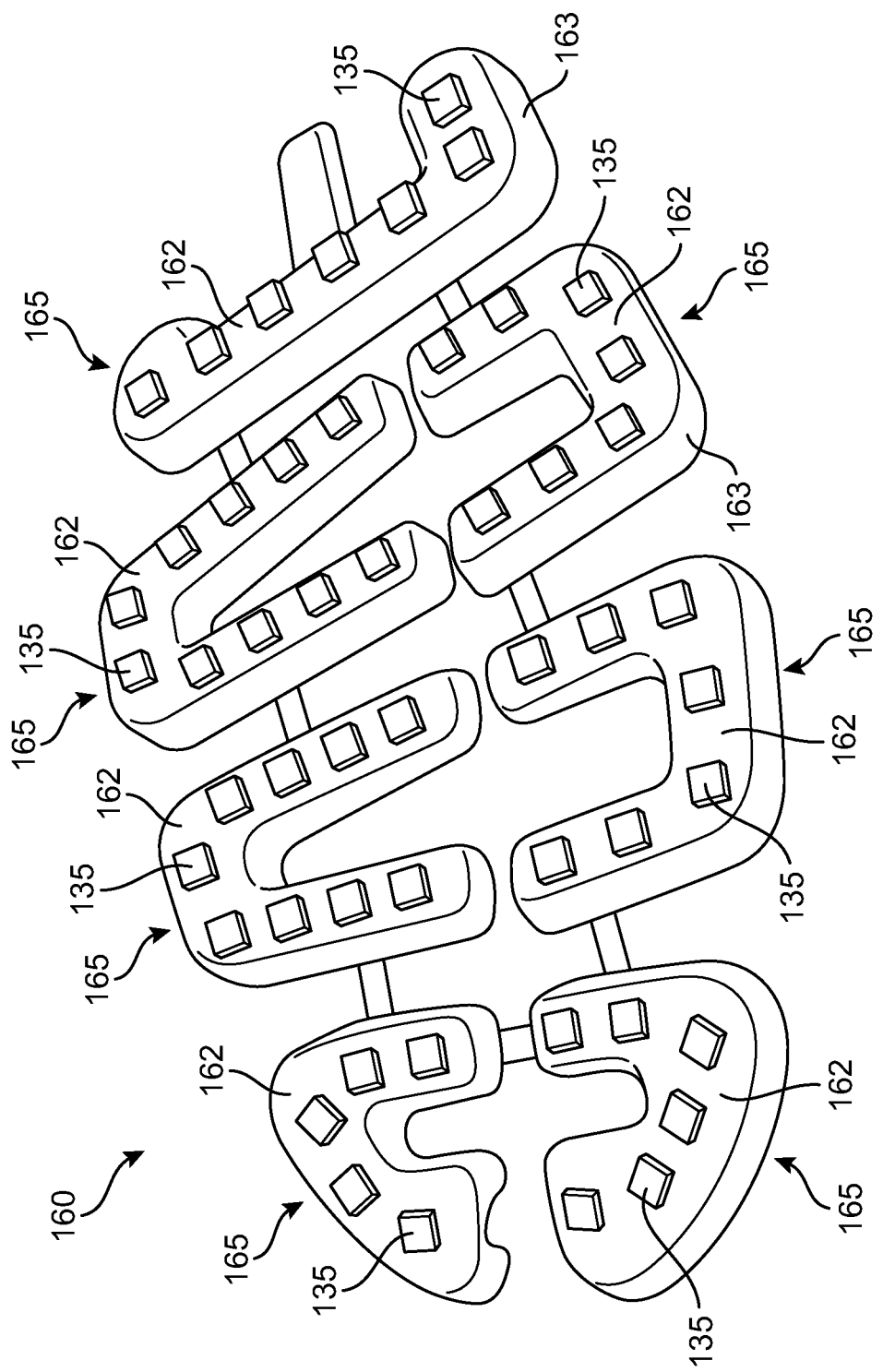
FIG. 6 is a bottom perspective view of a forefoot outsole of FIG. 2.

FIG. 6 illustrates an exemplary bottom surface of forefoot outsole 160. Forefoot outsole 160 includes forefoot outsole compartments 165 having ground-engaging lugs 135 on forefoot outsole outer lower surface 162. Forefoot outsole compartments 165 also include forefoot outsole outside edge 163.

Figure 7:
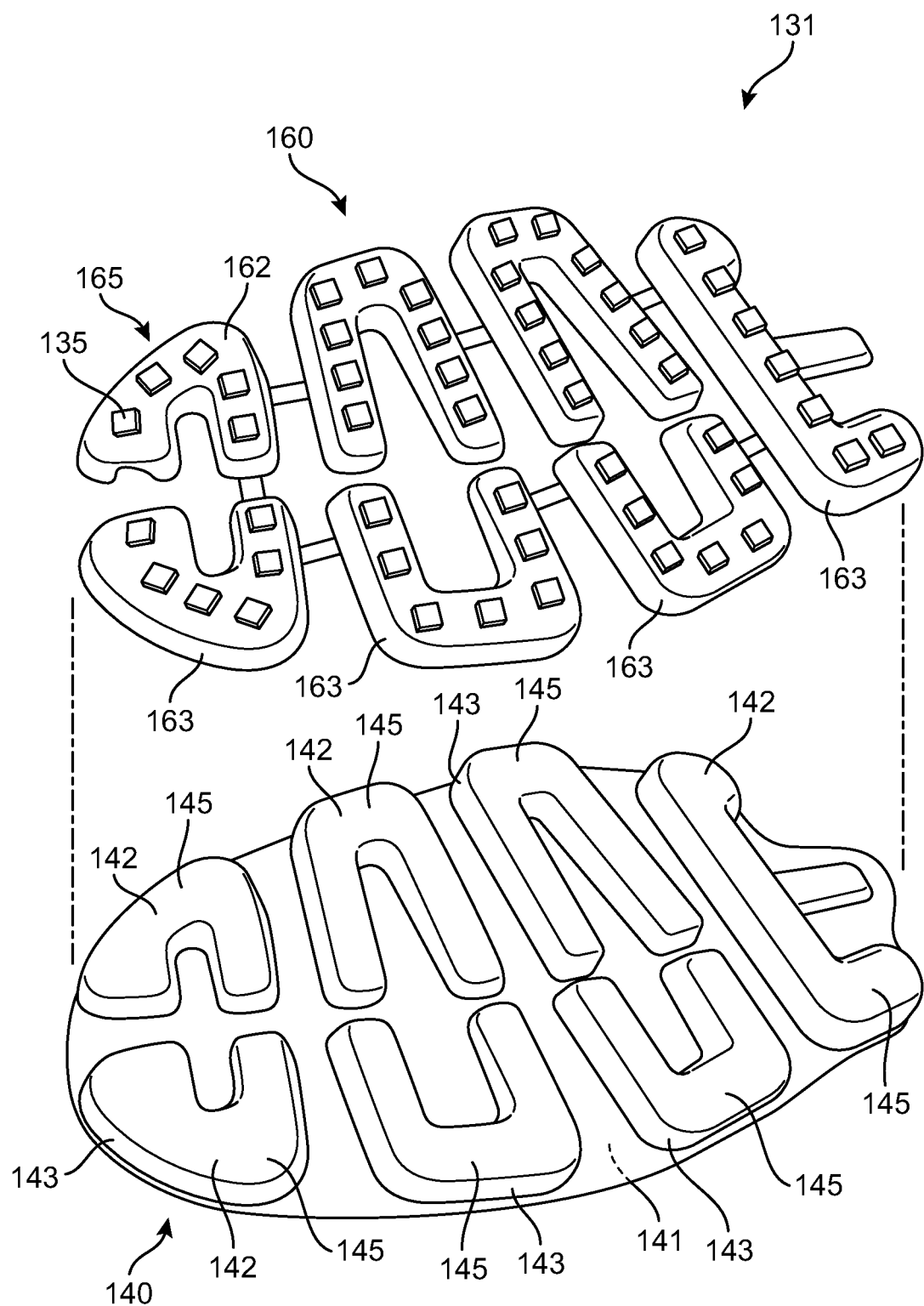
FIG. 7 is an exploded view illustrating a relationship between a forefoot outsole and a forefoot component that form a forefoot sole structure of FIG. 2.
Figure 8:
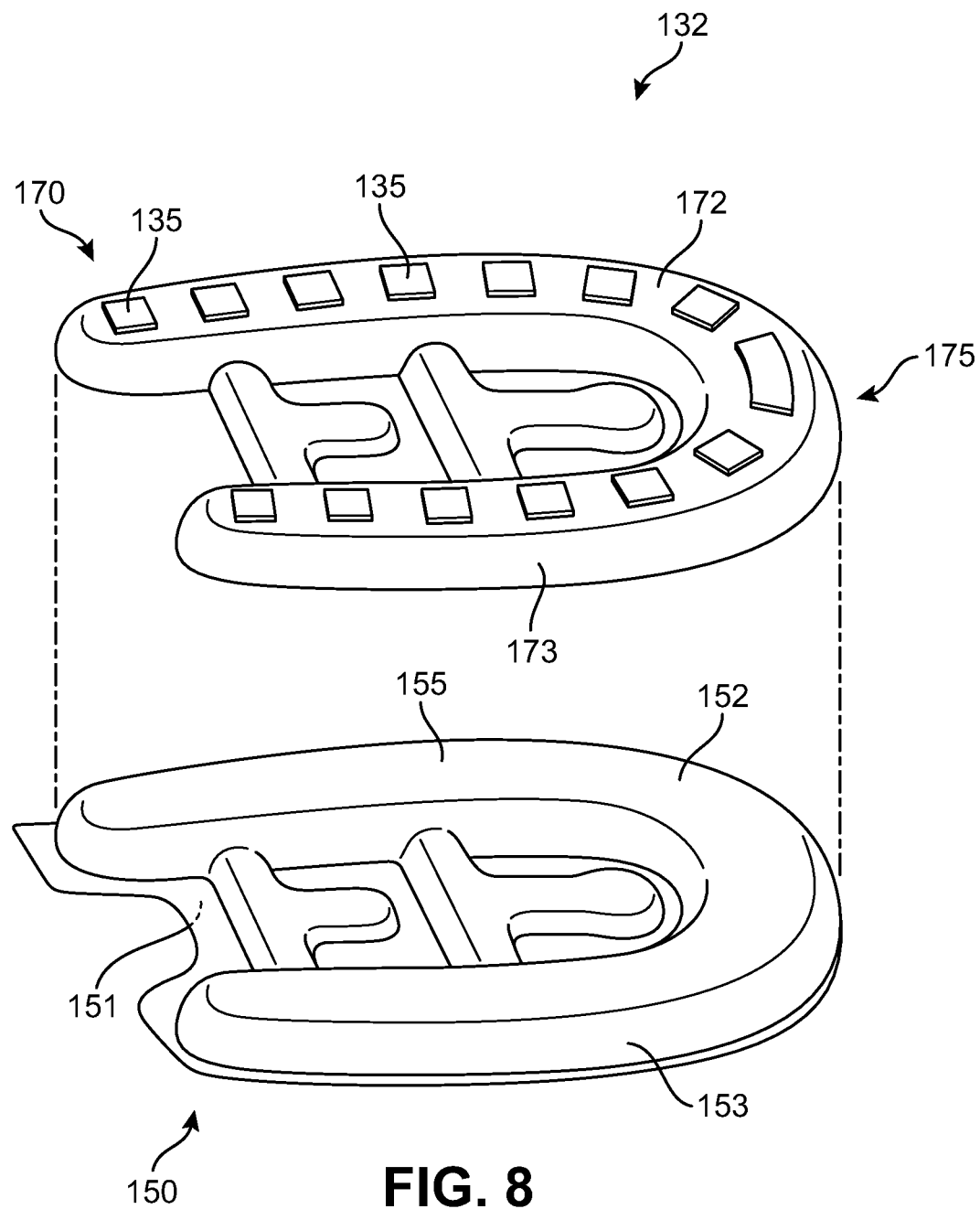
FIG. 8 is an exploded view illustrating a relationship between a heel outsole and a heel component that form a heel sole structure of FIG. 2.

A relationship between an embodiment of a forefoot component 140 and an embodiment of a forefoot outsole 160 is depicted in FIG. 7. Similarly, FIG. 8 is an illustration of the relationship between an embodiment of heel component 150 and an embodiment of heel outsole 170.

The relationship between an embodiment of forefoot component 140 and an embodiment of forefoot outsole 160 is illustrated in FIG. 7. In this embodiment, each forefoot component fluid-filled chamber 145 corresponds with a similarly-sized, congruently-shaped forefoot outsole compartment 165. In this embodiment, each forefoot outsole compartment 165 is aligned with and sufficiently large to accommodate a similarly-sized, congruently-shaped forefoot component fluid-filled chamber 145. In some embodiments, a forefoot component fluid-filled chamber 145 may combine with a forefoot outsole compartment 165 in a snug relationship. Forefoot outsole 160 then may be associated with forefoot component 140 by inserting forefoot component fluid-filled chambers 145 into the corresponding forefoot outsole compartments 165. In some embodiments, a forefoot outsole compartment 165 is bonded to a forefoot component fluid-filled chamber 145. In some embodiments, forefoot component 140 is co-molded with forefoot outsole 160. In some embodiments, forefoot outsole 160 is co-extensive with or overlaps at least a part of forefoot component lower surface 142 or of inside surface 164 (see FIG. 16), and forefoot component edge 1143 is co-extensive with or overlaps at least a part of forefoot component lower surface 1142 or sole inside surface 1164. In some embodiments, forefoot outsole compartments 165 surround forefoot component fluid-filled chambers 145.

FIG. 8 depicts relationship between an embodiment of heel component 150 and an embodiment of heel outsole 170. In this embodiment, a heel component fluid-filled chamber 155 corresponds with a heel outsole compartment 175. In the embodiment illustrated in FIG. 8, the single heel outsole compartment 175 may be associated with a similarly-sized, congruently-shaped heel component fluid-filled chamber 155. In another embodiment, heel component 150 may comprise plural fluid-filled chambers 155 and heel outsole 170 may comprise plural heel outsole compartments 175. In these embodiments, each heel outsole 170 fits onto similarly-sized, congruently-shaped heel component 150 by ensuring that each heel outsole compartment 175 is aligned with and sufficiently large enough to accommodate each heel component fluid-filled chamber 155. In some embodiments, a heel component fluid-filled chamber 155 may combine with a heel outsole compartment 175 in a snug relationship. Heel outsole 170 then may be associated with heel component 150 by inserting heel component fluid-filled chambers 155 into the corresponding heel outsole compartments 175. In some embodiments, a heel outsole compartment 175 is bonded to a heel component fluid-filled chamber 155. In some embodiments, heel component 150 is co-molded with heel outsole 170. In some embodiments, heel outsole compartment 175 surrounds heel component fluid-filled chamber 155. In some embodiments, the heel outsole 170 is co-extensive with or at least partly overlaps at least a part of heel component edge 153.

Figure 9:
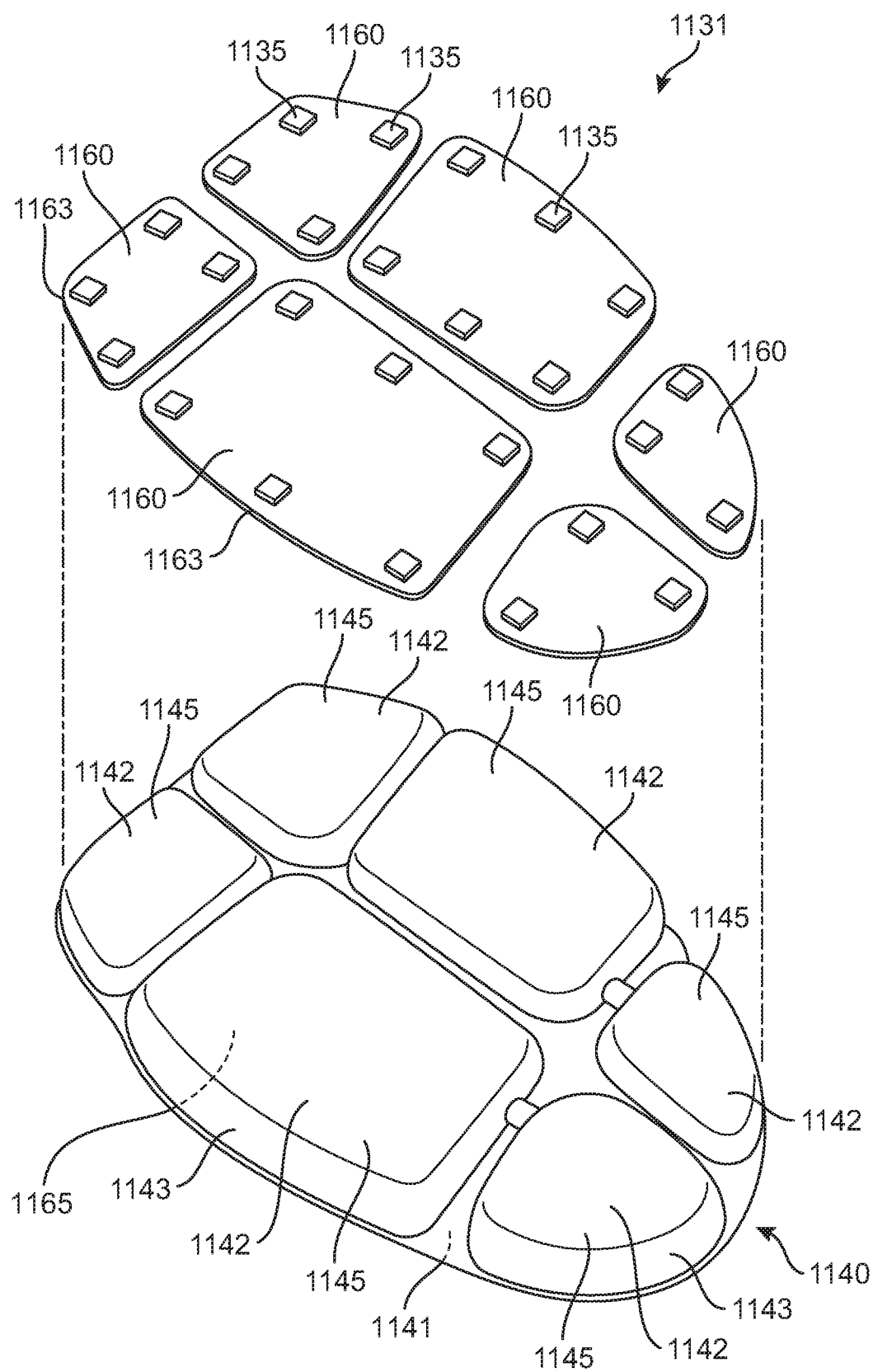
FIG. 9 is an exploded view illustrating a relationship between a forefoot outsole and a forefoot component that form a forefoot sole structure of FIG. 4.

FIG. 9 illustrates a relationship between forefoot component 1140 and forefoot outsole 1160 in forefoot sole structure 1131. Each of forefoot component fluid-filled chambers 1145 has a section or compartment 1165 of forefoot outsole 1160 associated therewith. Each forefoot outsole section 1165 of forefoot outsole 1160 may wrap around the corner between forefoot component fluid-filled chamber lower surface 1142 and forefoot component fluid-filled chamber edge 1143 of each forefoot component fluid-filled chamber 1145 of forefoot component 1140. Lugs 1135 may be attached to or formed on the lower surface of forefoot outsole 1160.

FIG. 9 illustrates another embodiment of a forefoot sole structure. Forefoot sole structure 1131 includes forefoot component 1140 having forefoot component fluid-filled chambers 1145 formed from a polymer material that defines forefoot component upper surface 1141, forefoot component lower surface 1142, and forefoot component edge 1143. Forefoot component upper surface 1141 is facing downward in FIG. 9.

FIG. 9 also illustrates the relationship between an embodiment of forefoot outsole 1160 and forefoot component 1140. As illustrated in FIG. 9, forefoot outsole 1160 includes forefoot outsole outer lower surface 1162 having ground-engaging lugs 1135 thereon. Forefoot outsole 1160 further includes forefoot outsole compartment edges 1163 that extend over at least part of forefoot component edge 1143.

Method for Manufacture

An outsole may be attached to a corresponding component in any suitable manner. In some embodiments, the outsole and component are adhered by adhesion as part of a co-molding process. In some embodiments, the outsole and corresponding component are adhered by partial melting as part of a co-molding process.

Forefoot component 140 and heel component 150 may be formed from any suitable polymeric material. Forefoot component 140 and heel component 150 may be formed of a single layer of material or multiple layers, and may be thermoformed or otherwise shaped. Examples of polymeric materials that may be utilized for forefoot component or a heel component include any of polyurethane, urethane, polyester, polyester polyurethane, polyether, polyether polyurethane, latex, polycaprolactone, polyoxypropylene, polycarbonate macroglycol, and blends thereof. These and other polymeric materials, and an exemplary embodiment of forefoot component 140 and heel component 150, and of a method for manufacturing them, may be found in co-pending application Ser. No. 13/773,360, filed Feb. 21, 2013, by Campos II et al., and entitled ARTICLE OF FOOTWEAR INCORPORATING A CHAMBER SYSTEM AND METHODS FOR MANUFACTURING THE CHAMBER SYSTEM, the entirety of which is hereby incorporated by reference.

In a co-molding process, an outsole first may be formed in any suitable manner. An outsole typically may be formed from any durable material. Typically, outsole material is tough, durable, resistant to abrasion and wear, flexible, and skid-resistant. In some embodiments, polyurethane materials sufficiently durable for ground contact. Suitable thermoplastic polyurethane elastomer materials include Bayer Texin®285, available from Bayer. Elastollan® SP9339, Elastollan® SP9324, and Elastollan® C705, available from BASF, also are suitable. Polyurethane and other polymers that may not be sufficiently durable for direct ground contact may be used to form part of an outsole in some embodiments. In such embodiments, a rubber outsole may be adhered or cemented onto the outsole. In embodiments, the outsole material is transparent or translucent. In embodiments, ground-engaging lugs may be integrally formed as part of an outsole, or may be separately formed and adhered to the outsole. The outsole may have a textured ground-engaging surface to improve traction.

An outsole then is placed in a mold that accommodates the outsole in an appropriate relationship with the corresponding component to be co-molded therewith. In some embodiments, adhesive may be applied to the appropriate surfaces of the outsole, the component, or both. The component then may be co-molded with the corresponding outsole to form a forefoot sole structure or a heel sole structure.

Figure 10:
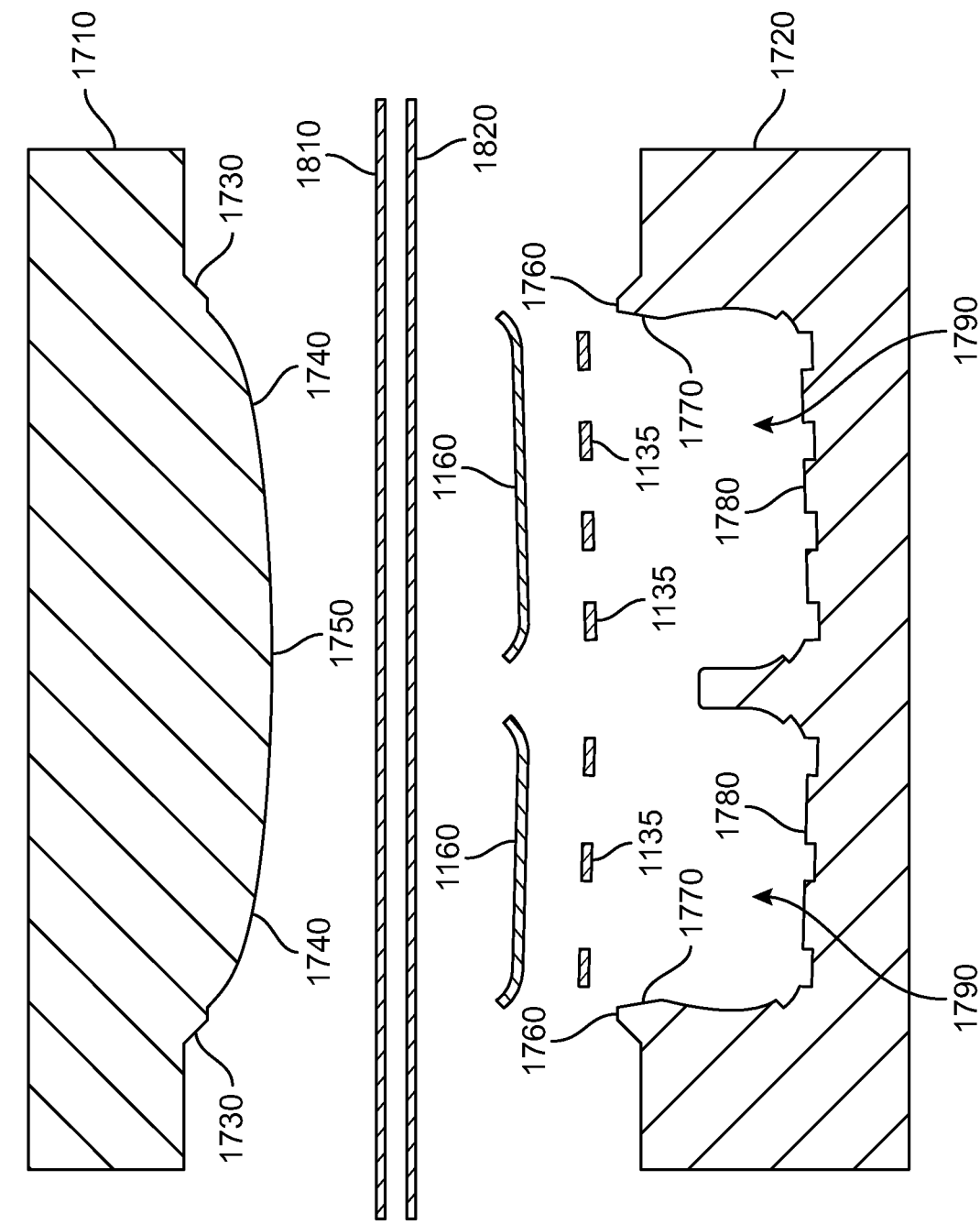
FIG. 10 is a cross-sectional view of an open mold illustrating a relationship of the parts for forming a forefoot sole structure of FIG. 4 in the mold.
Figure 11:
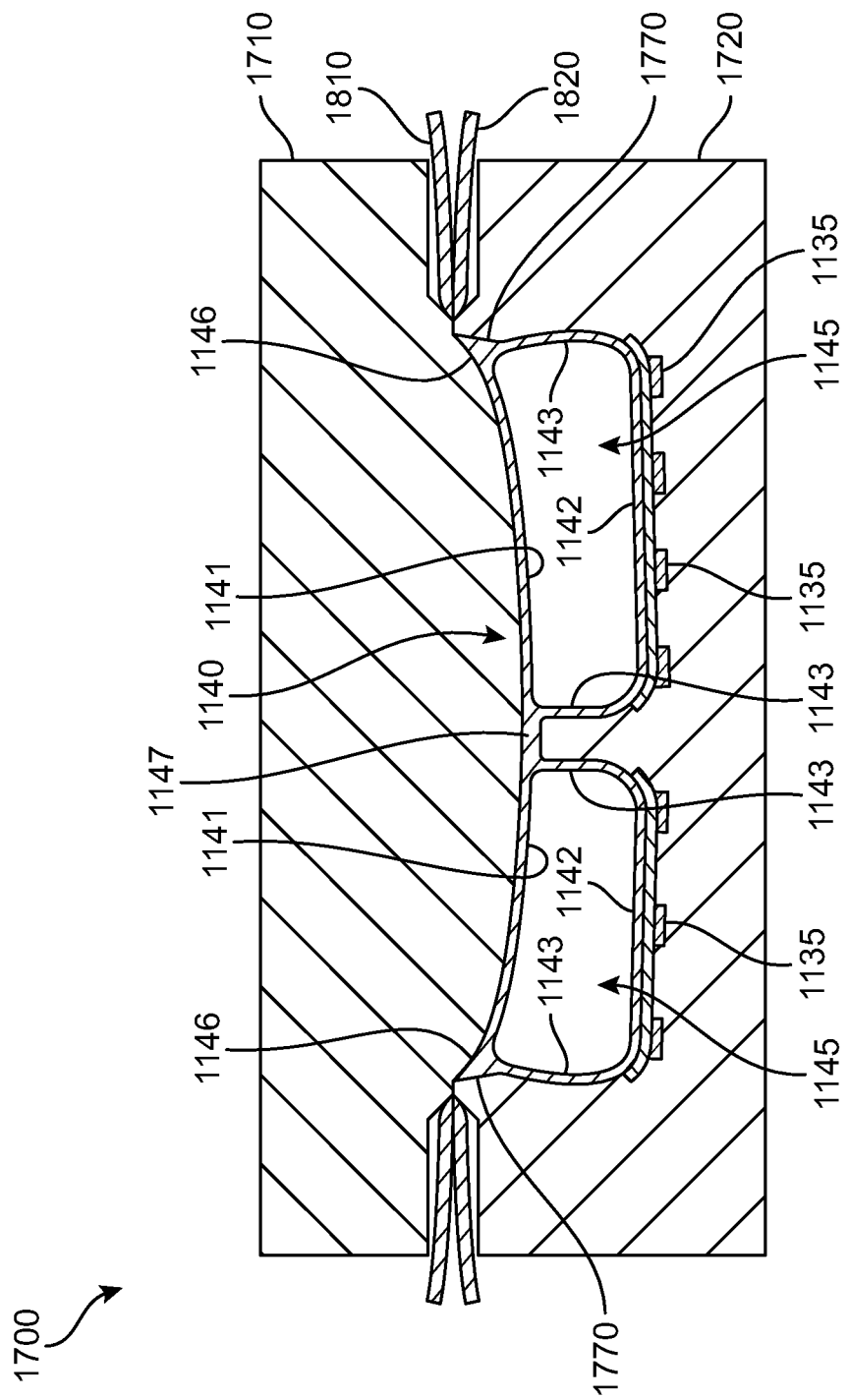
FIG. 11 is a cross-sectional view of a closed mold illustrating a forefoot sole structure of FIG. 4 formed in the mold.

FIG. 10 and FIG. 11 depict a mold for co-molding forefoot component 1140 with forefoot outsole 1160 with ground-engaging lugs 1135 thereon to form forefoot sole structure 1131. In some embodiments, forefoot outsole 1160 wraps at least a portion of forefoot component edge 1143 on forefoot component fluid-filled chamber 1145. This forefoot outsole section 1165 of forefoot outsole compartment edge 1163 that wraps at least a portion of forefoot component edge 1143 may be used to tune the cushioning response of the forefoot sole structure 1131, as described herein. The wrapping portion of forefoot outsole compartment edge 1163 may provide additional strength and resistance to flexure at the sidewall or edge of forefoot component fluid-filled chamber 1145. In some embodiments, forefoot outsole compartment edge 1163 wraps a short distance up fluid-filled chamber edge 1143. In other embodiments, forefoot outsole compartment edge 1163 wraps further up fluid-filled chamber edge 1143 to provide additional stiffness and better protect fluid-filled chamber edge 1143 from damage or wear. Forefoot sole structure 1131 is an embodiment of a forefoot sole structure having forefoot outsole 1160 wrapping a significant portion of forefoot component fluid-filled chamber 1145.

FIG. 10 and FIG. 11 are cross-sectional depictions of mold 1700 for forefoot component 1140. As shown in FIG. 10 and FIG. 11, forefoot component 1140 is co-molded with forefoot outsole 1160 present in the mold. Adhesive also may be present on appropriate portions of forefoot component 1140, particularly forefoot component fluid-filled chamber edges 1143 and forefoot component fluid-filled chamber lower surface 1142, or to chamber-engaging surfaces of forefoot outsole 1160 that will be in contact with forefoot component 1140.

A variety of manufacturing processes may be utilized to form forefoot sole structure 1131. In some embodiments, mold 1700 that may be utilized in the manufacturing process is depicted as including a first mold portion 1710 and a second mold portion 1720. Mold 1700 is utilized to form forefoot component 1140 from a first polymer layer 1810 and a second polymer layer 1820, which are the polymer layers forming forefoot component upper surface 1141 and forefoot component lower surface 1142, respectively. More particularly, mold 1700 facilitates the manufacturing process by (a) shaping first polymer layer 1810 and second polymer layer 1820 in areas corresponding with forefoot component fluid-filled chambers 1145, forefoot component flange 1146, and conduits between chambers, and (b) joining first polymer layer 1810 and second polymer layer 1820 in areas corresponding with forefoot component flange 1146 and forefoot component web area 1147.

Various surfaces or other areas of mold 1700 will now be defined for use in discussion of the manufacturing process. Referring now to FIG. 10 and FIG. 11, first mold portion 1710 includes a pinch surface 1730, a first seam-forming surface 1740, and a compression surface 1750. Pinch surfaces 1730 and first seam-forming surface 1740 are angled relative to each other, with pinch surface 1730 being more vertical than first seam-forming surface 1740. Second mold portion 1720 includes a pinch edge 1760 and a second seam-forming surface 1770. Whereas pinch edge 1760 is a relatively sharp corner or angled area in second mold portion 1720, second seam-forming surface 1770 extends downward and is generally, although not necessarily, parallel to pinch surface 1730. A void volume 1790 within mold 1700 and between mold portions 1710 and 1720 has a shape of forefoot component 1140, prior to pressurization, and forms various features of forefoot component 1140. A portion of this void volume 1790 is identified as a depression 1780 in second mold portion 1720.

Each of first polymer layer 1810 and second polymer layer 1820 are initially located between each of first mold portion 1710 and second mold portion 1720, which are in a spaced or open configuration, as depicted in FIG. 10 and FIG. 11. In this position, first polymer layer 1810 is positioned adjacent or closer to first mold portion 1710, and second polymer layer 1820 is positioned adjacent or closer to second mold portion 1720. A shuttle frame or other device may be utilized to properly position first polymer layer 1810 and second polymer layer 1820. As part of the manufacturing process, one or both of first polymer layer 1810 and second polymer layer 1820 are heated to a temperature that facilitates shaping and bonding. As an example, various radiant heaters or other devices may be utilized to heat first polymer layer 1810 and second polymer layer 1820, possibly prior to being located between first mold portion 1710 and second mold portion 1720. As another example, mold 1700 may be heated such that contact between mold 1700 and first polymer layer 1810 and second polymer layer 1820 at a later portion of the manufacturing process raises the temperature to a level that facilitates shaping and bonding.

Once first polymer layer 1810 and second polymer layer 1820 are properly positioned, first mold portion 1710 and second mold portion 1720 translate or otherwise move toward each other and begin to close upon first polymer layer 1810 and second polymer layer 1820. As first mold portion 1710 and second mold portion 1720 move toward each other, various techniques may be utilized to draw first polymer layer 1810 and second polymer layer 1820 against surfaces of first mold portion 1710 and second mold portion 1720, thereby beginning the process of shaping first polymer layer 1810 and second polymer layer 1820. For example, air may be partially evacuated from the areas between (a) first mold portion 1710 and first polymer layer 1810 and (b) second mold portion 1720 and second polymer layer 1820. More particularly, air may be withdrawn through various vacuum ports in first mold portion 1710 and second mold portion 1720. By removing air, first polymer layer 1810 is drawn into contact with the surfaces of first mold portion 1710 and second polymer layer 1820 is drawn into contact with the surfaces of second mold portion 1720. As another example, air may be injected into the area between first polymer layer 1810 and second polymer layer 1820, thereby elevating the pressure between first polymer layer 1810 and second polymer layer 1820. During a preparatory stage of this process, an injection needle may be located between first polymer layer 1810 and second polymer layer 1820, and a gas, liquid, or gel, for example, then may be ejected from the injection needle such that first polymer layer 1810 and second polymer layer 1820 engage the surfaces of mold 1700. Each of these techniques may be used together or independently.

As first mold portion 1710 and second mold portion 1720 continue to move toward each other, first polymer layer 1810 and second polymer layer 1820 are pinched between first mold portion 1710 and second mold portion 1720. More particularly, first polymer layer 1810 and second polymer layer 1820 are compressed between pinch surface 1730 and pinch edge 1760. In addition to beginning the process of separating excess portions of first polymer layer 1810 and second polymer layer 1820 from portions that form forefoot component 1140, the pinching of first polymer layer 1810 and second polymer layer 1820 begins the process of bonding or joining first polymer layer 1810 and second polymer layer 1820 in the area of forefoot component flange 1146.

Following the pinching of first polymer layer 1810 and second polymer layer 1820, first mold portion 1710 and second mold portion 1720 proceed with moving toward each other and into a closed configuration, as depicted in FIG. 11. As the mold closes, pinch surface 1730 contacts and slides against a portion of second seam-forming surface 1770. The contact between pinch surface 1730 and second seam-forming surface 1770 effectively severs excess portions of first polymer layer 1810 and second polymer layer 1820 from portions that form forefoot component 1140. In addition, the sliding movement pushes portions of the material forming first polymer layer 1810 and second polymer layer 1820 downward and further into depression 1780. Moreover, the material forming first polymer layer 1810 and second polymer layer 1820 compacts or otherwise collects in the area between first seam-forming surfaces 1740 and second seam forming surface 1770. Given that first seam-forming surface 1740 and second seam-forming surface 1770 are angled relative to each other, the compacted polymer material forms a generally triangular or tapered structure, which results in forefoot component flange 1146. In addition to forming forefoot component flange 1146, first polymer layer 1810 and second polymer layer 1820 are (a) shaped to form forefoot component fluid-filled chambers 1145 and (b) compressed and joined to form web area 1147.

At the stage of the process depicted in FIG. 11, a void volume 1790, which is located between compression surface 1750 and depression 1780 within mold 1700, effectively has the shape of forefoot component 1140 prior to inflation or pressurization. Moreover, a peripheral portion of the void includes an area that forms forefoot component flange 1146 between first seam-forming surface 1740 and second seam-forming surface 1770. The non-parallel configuration between first seam-forming surface 1740 and second seam-forming surface 1770 results in a tapered space where the polymer material collects to form forefoot component flange 1146. A distance across the space between first seam-forming surface 1740 and second seam-forming surface 1770 is greater adjacent to a portion of the void volume 1790 that forms fluid-filled components 1145 than in the area where first seam-forming surface 1740 and second seam-forming surface 1770 meet, which is spaced from the portion of the void that forms forefoot component fluid-filled chambers 1145. Although the configuration of the tapered space between first seam-forming surface 1740 and second seam-forming surface 1770 may vary, an angle formed between first seam-forming surface 1740 and second seam-forming surface 1770 may be in a range of between twenty degrees and forty-five degrees.

As described above, the material forming first polymer layer 1810 and second polymer layer 1820 compacts or otherwise collects in the area between first seam-forming surface 1740 and second seam-forming surface 1770. This compaction effectively thickens one or both of first polymer layer 1810 and second polymer layer 1820. That is, whereas first polymer layer 1810 and second polymer layer 1820 have a first thickness at the stage depicted in FIG. 11, one or both of first polymer layer 1810 and second polymer layer 1820 within flange 1146 may have a second, greater thickness at the stage depicted in FIG. 11. The compaction that occurs as pinch surface 1730 contacts and slides against a portion of second seam-forming surface 1770 increases the thickness of the polymer material forming one or both of first polymer layer 1810 and second polymer layer 1820.

When forming forefoot component 1140 is complete, mold 1700 is opened and forefoot structure 1131 is removed and permitted to cool. A fluid then may be injected into forefoot component 1140 to pressurize forefoot component fluid-filled chambers 1145, thereby completing the manufacture of forefoot sole structure 1131. As a final step in the process, forefoot sole structure 1131 may be incorporated into a sole structure of an article of footwear 100.

FIG. 10 and FIG. 11 illustrate an embodiment having relatively small overlap of forefoot outsole 1160 on forefoot component edges 1143 of forefoot component fluid-filled chambers 1145. FIG. 10 and FIG. 11 also illustrate an embodiment in which forefoot component edges 1143 of fluid-filled chambers 1145 of forefoot component 1140 form a forefoot sole structure 1131 having a continuous, smooth shape from forefoot component upper surface 1141 to forefoot component lower surface 1142.

Figure 12:
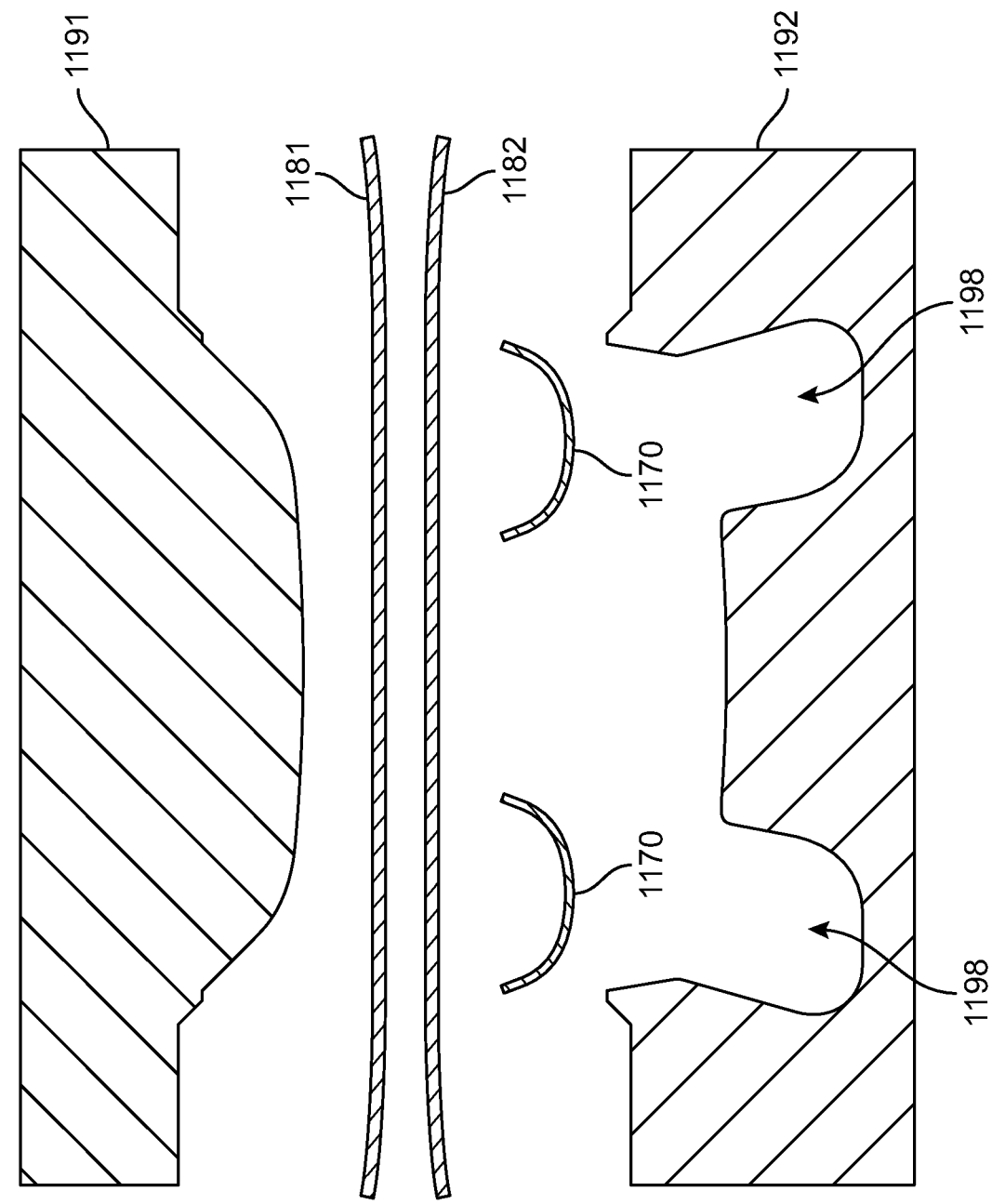
FIG. 12 is a cross-sectional view of an open mold illustrating the relationship of the parts for forming a heel sole structure of FIG. 2 in the mold.
Figure 13:
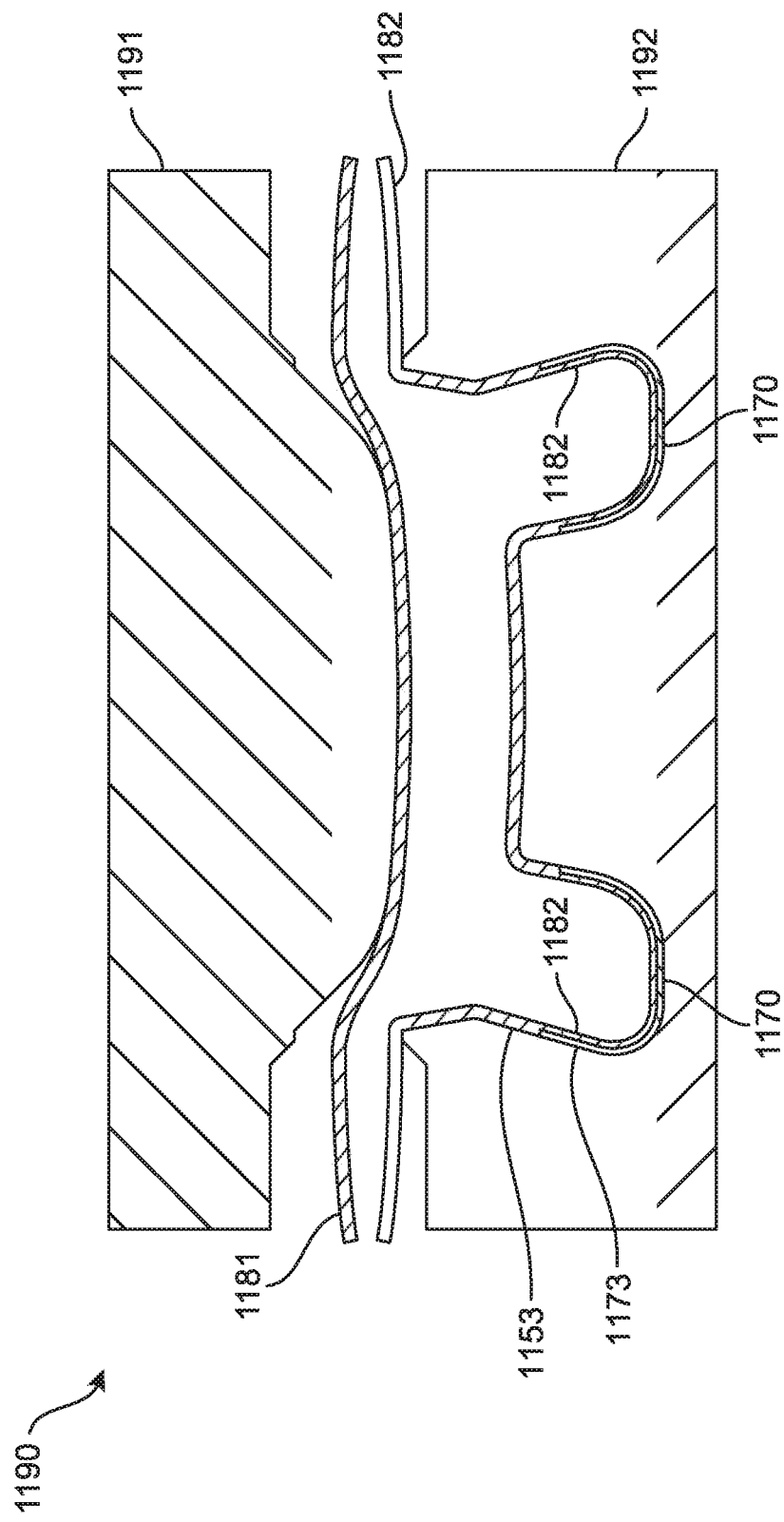
FIG. 13 is a cross-sectional view of a partially-formed heel sole structure of FIG. 2 in a partially-open mold.

FIG. 12 and FIG. 13 illustrate a mold for a heel component wherein heel outsole 1170 is placed in a mold portion in an area that is not formed to accommodate the outsole. Then, the heel component 1150 is co-molded with and encompasses heel outsole 1170. This technique yields a heel sole structure 1132 having heel component edges 1153 flush with heel outsole edges 1173.

Although a variety of manufacturing processes may be utilized, heel sole structure 1132 may be formed through a process that is generally similar to the process discussed above for forefoot component 1140 and forefoot sole structure 1131. Mold 1190 that may be utilized in the manufacturing process is depicted as including a first mold portion 1191 and a second mold portion 1192. Mold 1190 is utilized to form heel component 1150 from additional elements of first polymer layer 1181 and second polymer layer 1182, which are the polymer layers forming, respectively, heel component upper surface 1151 and heel component lower surface 1152. More particularly, mold 1190 facilitates the manufacturing process by (a) shaping first polymer layer 1181 and second polymer layer 1182 in areas corresponding with heel component fluid-filled chamber 1155 and heel component flange 1156 and (b) joining first polymer layer 1181 and second polymer layer 1182 in areas corresponding with heel component flange 1156 and heel component web area 1157. In addition, mold 1190 facilitates the bonding of heel outsole 1170 to heel component 1150.

Each of first polymer layer 1181 and second polymer layer 1182 is initially located between each of first mold portion 1191 and second mold portion 1192, as depicted in FIG. 12. In addition, one or more elements that form outsole 1170 are also located relative to mold 1190. Once first polymer layer 1181 and second polymer layer 1182 are properly positioned and the elements of outsole 1170 are located within void volume 1198 in second mold portion 1192, first mold portion 1191 and second mold portion 1192 translate or otherwise move toward each other and begin to close upon first polymer layer 1181 and second polymer layer 1182, as depicted in FIG. 13. As discussed above, air may be partially evacuated from the areas between (a) first mold portion 1191 and first polymer layer 1181 and (b) second mold portion 1192 and second polymer layer 1182. Additionally, fluid may be injected into the area between first polymer layer 1181 and second polymer layer 1182. Fluid may be selected from the group consisting of air, liquid, gel, and blends thereof. Using one or both of these techniques, first polymer layer 1181 and second polymer layer 1182 are induced to engage the surfaces of mold 1190. Additionally, first polymer layer 1181 and second polymer layer 1182 also lay against heel outsole 1170. In effect, therefore, first polymer layer 1181 and second polymer layer 1182 are shaped against surfaces of mold 1190 and outsole 1170, as shown in FIG. 13.

Figure 14:
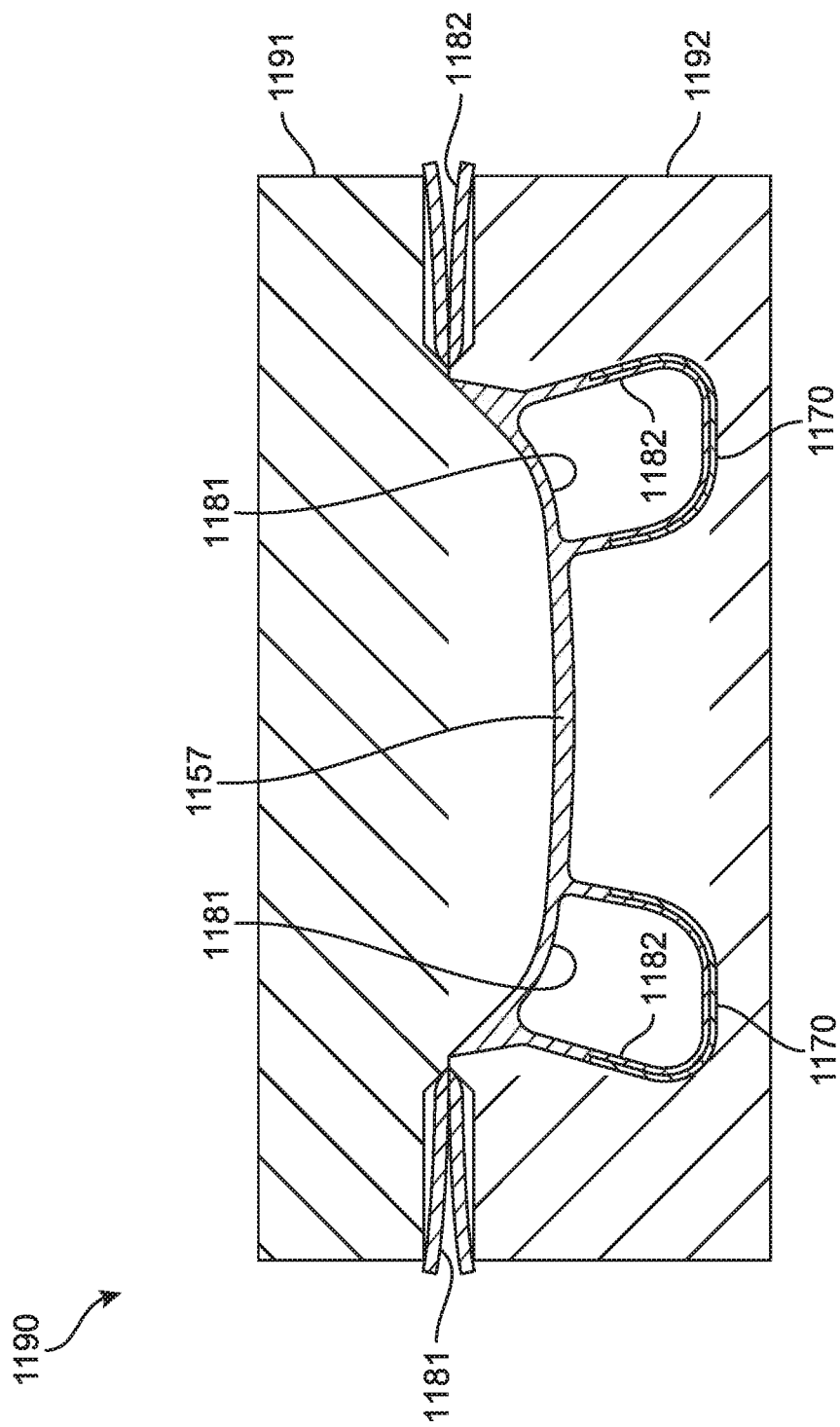
FIG. 14 is a cross-sectional view of a closed mold illustrating the heel sole structure of FIG. 2 formed in the mold.

As first mold portion 1191 and second mold portion 1192 continue to move toward each other, first polymer layer 1181 and second polymer layer 1182 are compressed between first mold portion 1191 and second mold portion 1192, as depicted in FIG. 14. More particularly, first polymer layer 1181 and second polymer layer 1182 are compressed to form heel component flange 1156 and heel component web area 1157. Polymer layer 1182 also bonds with outsole 1170.

Figure 15:
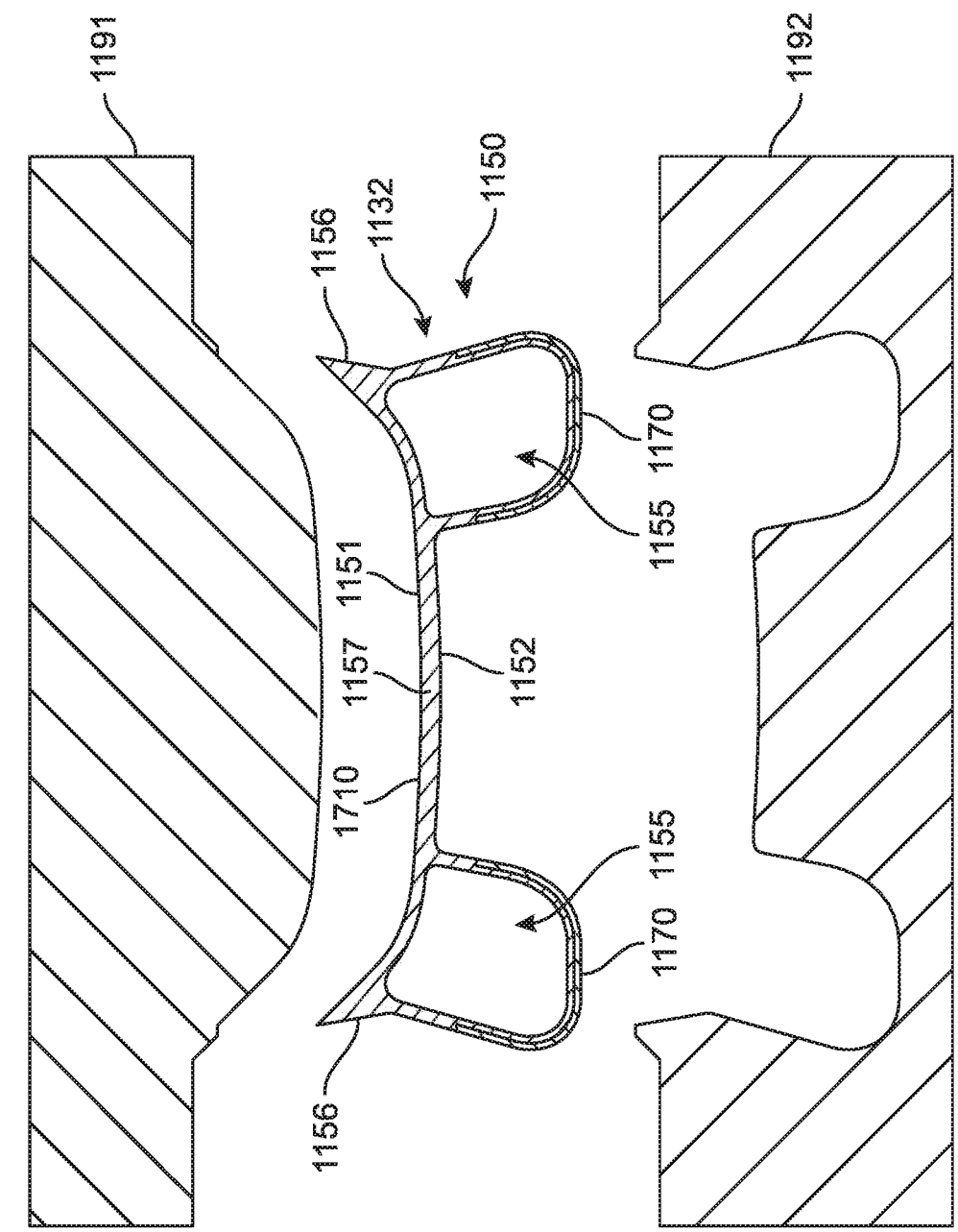
FIG. 15 is a cross-sectional view of a heel sole structure of FIG. 2 removed from the mold opened after forming the structure.

When the manufacture of heel sole structure 1132 is complete, mold 1190 is opened and heel sole structure 1132 is removed and permitted to cool, as depicted in FIG. 15. A fluid then may be injected into heel component 1150 to pressurize heel component fluid-filled chambers 1155, thereby completing the manufacture of heel sole structure 1132. As a final step in the process, heel sole structure 1132 may be incorporated into sole structure 1130 of article of footwear 100.

As first polymer layer 1181 and second polymer layer 1182 are drawn into mold 1190, particularly the larger volumes in second mold portion 1191, first polymer layer 1181 and second polymer layer 1182 stretch to conform to the contours of mold 1190. When first polymer layer 1181 and second polymer layer 1182 stretch, they also thin or otherwise decrease in thickness. Accordingly, the initial thicknesses of first polymer layer 1181 and second polymer layer 1182 may be greater than the resulting thicknesses after the manufacturing process.

Figure 17:
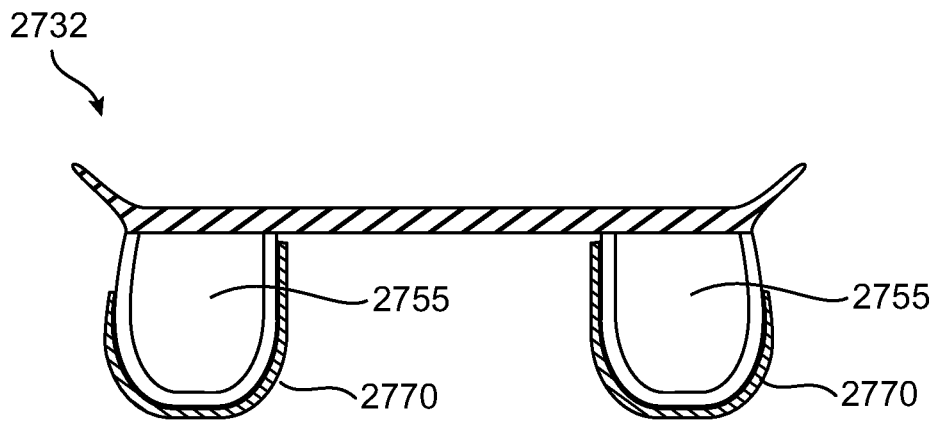
FIG. 17 is a cross-sectional view of an embodiment of a heel sole structure.
Figure 18:
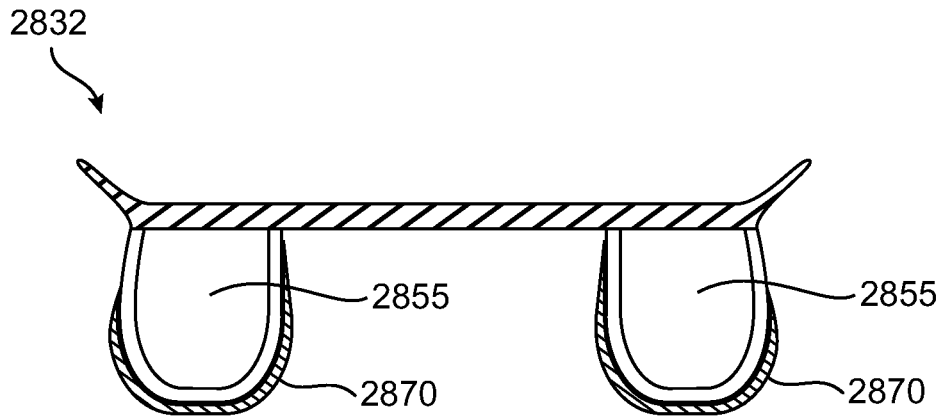
FIG. 18 is a cross-sectional view of another embodiment of a heel sole structure.
Figure 19:
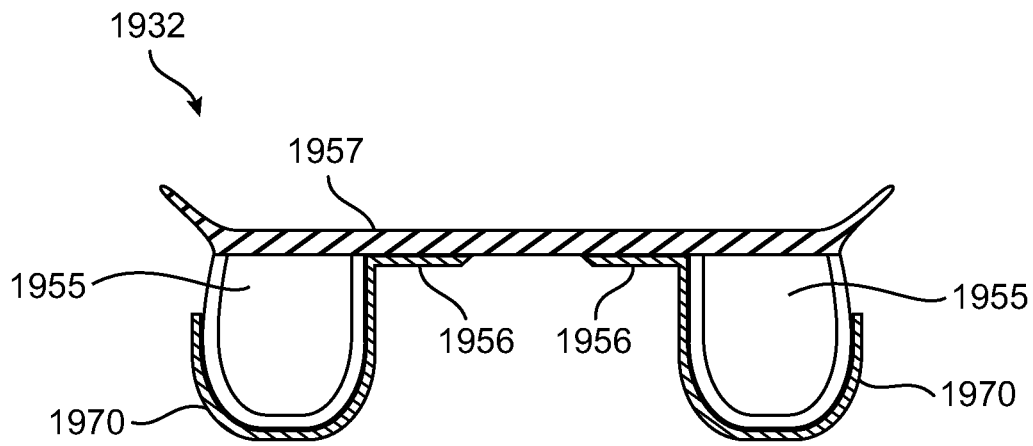
FIG. 19 is a cross-sectional view of still another embodiment of a heel sole structure.

FIG. 17, FIG. 18, and FIG. 19 illustrate other embodiments of heel sole structures. FIG. 17 illustrates heel sole structure 2732 including heel outsole portions 2770. In embodiments illustrated in FIG. 17, heel outsole portions 2770 have a first thickness at the ground-engaging area, such as the location for traction lugs, and a second, lesser thickness on at least part of one or both vertical surfaces of heel component fluid-filled chamber 2755. The thickness may be changed in a gradual way, such as by a linear taper, or may be stepwise. Heel outsole portions 2770 are thinner on the outside vertical surfaces of heel component fluid-filled chamber 2755 than they are at the ground-engaging area. In this way, the elastic response of heel sole structure 2732 may be tuned.

FIG. 18 illustrates heel sole structure 2832 having heel outsole portions 2870, which are thinner on both vertical surfaces of heel component fluid-filled chambers 2855 than they are at the ground-engaging area. In other embodiments, only the inside vertical surfaces of heel outsole portions 2770 or 2870 may be thinned on the vertical surfaces of heel component fluid-filled chambers 2755 or 2855, respectively.

In some embodiments, any combination of such configurations may be used, thus providing additional opportunities to tune the elastic response of the heel sole structure.

FIG. 19 illustrates another embodiment of a heel sole structure. Heel sole structure 1932 includes heel outsole portions 1970. Heel outsole portions 1970 extend up the interior vertical surfaces of heel component fluid-filled chambers 1955 to heel component web area 1957. The heel outsole portions also include a flange that extends across a portion of heel component web area 1957. This flange provides an additional feature that can be varied to tune the elastic response of the heel component. Heel outsole portions 1970 extend a distance up the exterior vertical surfaces of heel component fluid-filled chambers 1955. This distance also may be varied to adjust the elastic response of the heel outsole portions.

Any of these and other suitable manufacturing techniques may be used to form forefoot structures and heel structures. In particular, a manufacturing technique described herein for a forefoot structure may be used to form a heel structure, and a technique described herein for a heel structure may be used to form a forefoot structure. Separate parts may be bonded to a corresponding component by adhesion or by partial melting. In some embodiments, an outsole may be thermally bonded to a corresponding component during the manufacturing process to form a sole structure. For example, when each of a second polymer layer and the corresponding outsole are formed from similar or compatible polymer materials, or when the outsole is at least partially formed from the polymer material of a fluid-filled chamber, heating of the polymer layer/fluid-filled chamber and the outsole may induce thermal bonding between the components. Similarly, ground-engaging lugs may be formed integrally with an outsole, or may be bonded thereto using any suitable technique, such as adhering or partial melting. In some embodiments, it may be convenient to bond parts with heat-activated adhesive.

In some embodiments, a polymer layer of a fluid-filled chamber to which the ground-engaging portions of an outsole may be attached by co-molding or may instead be co-extruded with the outsole ground-engaging portions. In this manner, the manufacture of the components may be simplified, including in particular making molding easier. If lugs are to be added, the lugs may be placed in the mold for co-molding with the other parts of the outsole, as described above.

In some embodiments, the fluid-filled chamber layer and the outsole portions may be compatible compositions that may be co-extruded as adjacent layers that may form a mutual bond upon co-extrusion. In some embodiments, a tie layer may be required to adhere an outsole portion to a fluid-filled chamber polymer layer. In some embodiments, lugs forming part of the ground-engaging outsole may be placed in the mold and co-molded with the rest of the layers.

With the guidance provided herein, the user will be able to identify a suitable method without undue experimentation.

The joints between lugs and outsoles and between outsoles and components may be made aesthetically pleasing in embodiments of the disclosure in which the joint can be seen by the user, for example when the pieces that form the sole structure are transparent or translucent. In some embodiments, an adhesive that softens in response to heat, such as the heat of molding, also may be suitable.

In some embodiments, an outsole piece that may be positively sprung may be pressed into a mold. A fluid-filled chamber may be overmolded onto the outsole piece. Although the thermoforming molds may have undercuts, the outsole pieces typically do not. In such embodiments, a non-undercut outsole piece may create distortion in the outsole element. In particular, the outsole piece may pull away from the mold side wall. However, the fluid-filled chamber then is over-molded onto the outsole piece. The overmolding pushes the outsole back into position when pressure is introduced into the fluid-filled chamber in the mold, and thus pushes the outsole into shape. This technique is fully illustrated in [application incorporated by reference].

Method for Manufacturing an Article of Footwear

An article of footwear having an upper and a sole structure may be manufactured by securing at least part of the upper to at least part of the sole structure. In some embodiments, the sole structure includes a fluid-filled chamber that includes an edge, an upper surface, and a lower surface. The sole structure also includes an outsole. The outsole is co-molded to at least a part of the lower surface of the fluid-filled chamber and to at least a part of the edge of the fluid-filled chamber. The outsole is co-extensive with at least part of the lower surface of the chamber and with at least part of the edge of the chamber. The outsole and the fluid-filled chamber may be bonded by adhesive or by partially melting at least one of the surfaces to be bonded.

Method for Minimizing Gas Inclusions

In some embodiments, particularly when adhesive is used to bond an outsole to a component to form a sole structure, a feature that some users may find aesthetically objectionable may form. As shown in FIG. 4, feature 900 is an example of an inclusion that is a small gas bubble between forefoot outsole 1160 and forefoot component fluid-filled chamber lower surface 1142, both of which may have smooth surfaces. Such inclusions may not be visible in all circumstances. However, the inclusions may weaken the bond between the component and the outsole, especially if the inclusions are concentrated or prevalent in an area.

In some embodiments, the bond between parts may be made more aesthetically pleasing and stronger by providing a texture on at least one of the component lower surface and the outsole inside lower surface. In some embodiments, the textured surface may have lands and grooves, or high areas (e.g., projections or lands) and low areas (e.g., recesses or grooves). In some embodiments, gas escape openings in an outsole may allow trapped gas to escape.

In some embodiments, the thickness of the adhesive is less than the depth of the grooves or low areas of the texture. An excess of adhesive may weaken the bond because it may preclude sufficient contact between the surfaces, i.e., between the high areas of the textured surface and the other surface, by filling the volumes between the low areas of the texture. Filling the low area of the texture may force the land, or high area of the texture, away from the other surface, thus precluding good bonding.

The texture need not be regular or patterned, but, as described above, should ensure that the high areas are of consistent height and sufficiently prevalent so as to ensure adequate contact between the outsole and the component lower surface. In some embodiments, the texture is a regular, repeating, patterned texture, such as straight groves, intersecting grooves, circles, triangles, or any other shape. In some embodiments, other aesthetically pleasing texture, such as words, letters, numbers, logotypes, or slogans may be suitable textures.

Although a textured bonding surface may trap a quantity of gas during bonding, the texture may serve to minimize any reduction in strength and may contribute to a pleasing aesthetic. In some embodiments, the texture may serve to ensure that any large inclusions are precluded and broken into smaller inclusions distributed over the surface. Also, a regular pattern, such as that illustrated in FIG. 16, may be more aesthetically pleasing because low points may include a gas bubble or the appearance of a gas bubble, thus presenting a regular appearance. Further, such a pattern may yield a high-strength bond, as the adhesive is able to form a good bond between the high points and the other surface. A texture also may form excellent bonds on areas adjacent high points, as the adhesive may spread between the surfaces to form a strong bond.

Figure 16:
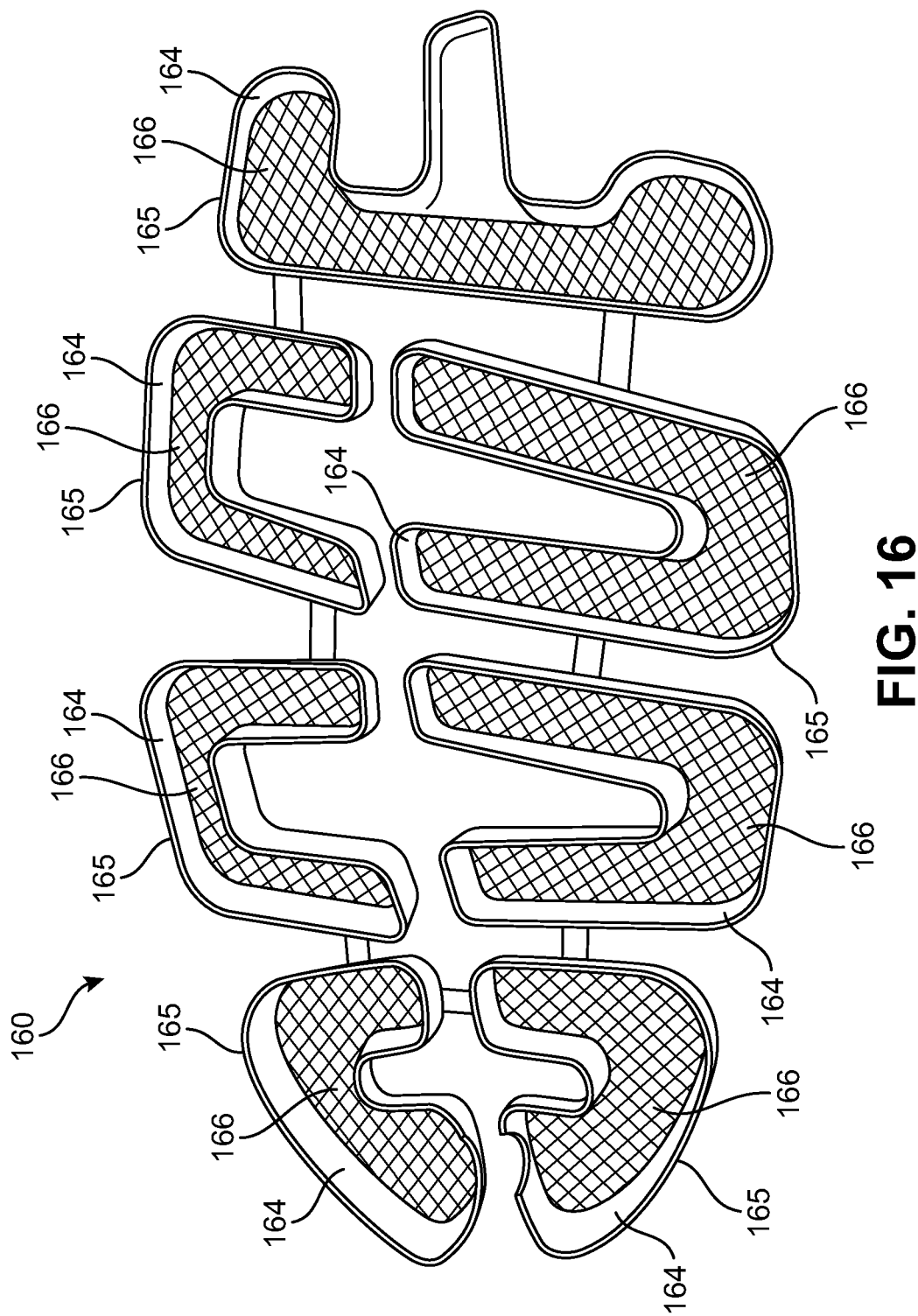
FIG. 16 is a top view of the interior of a forefoot outsole of FIG. 4.

FIG. 16 illustrates a top view of forefoot outsole 160 having forefoot outsole compartments 165 and forefoot outsole inner edges 164. Forefoot outsole inside lower surface 166 is textured with a regular pattern of non-parallel grooves that form a square or diamond pattern on the forefoot outsole inside lower surface 166. In some embodiments, the lines indicate raised areas, and the area between the lines is a low area. In some embodiments, the lines indicate grooves cut into the surface. With the guidance provided herein, the user can identify a suitable texture for either surface.

Figure 20:
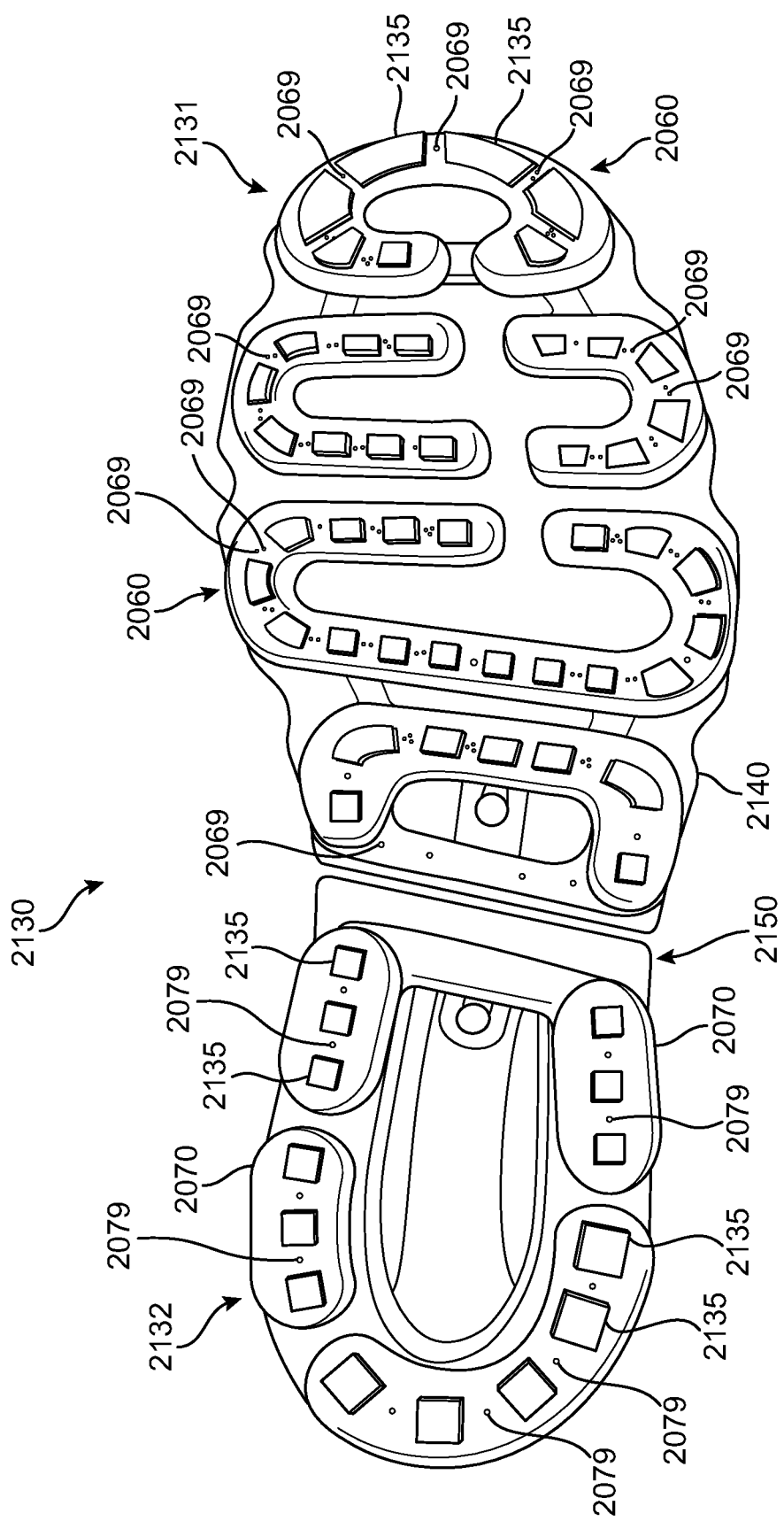
FIG. 20 is a bottom view of an embodiment of an article of footwear.
Figure 21:
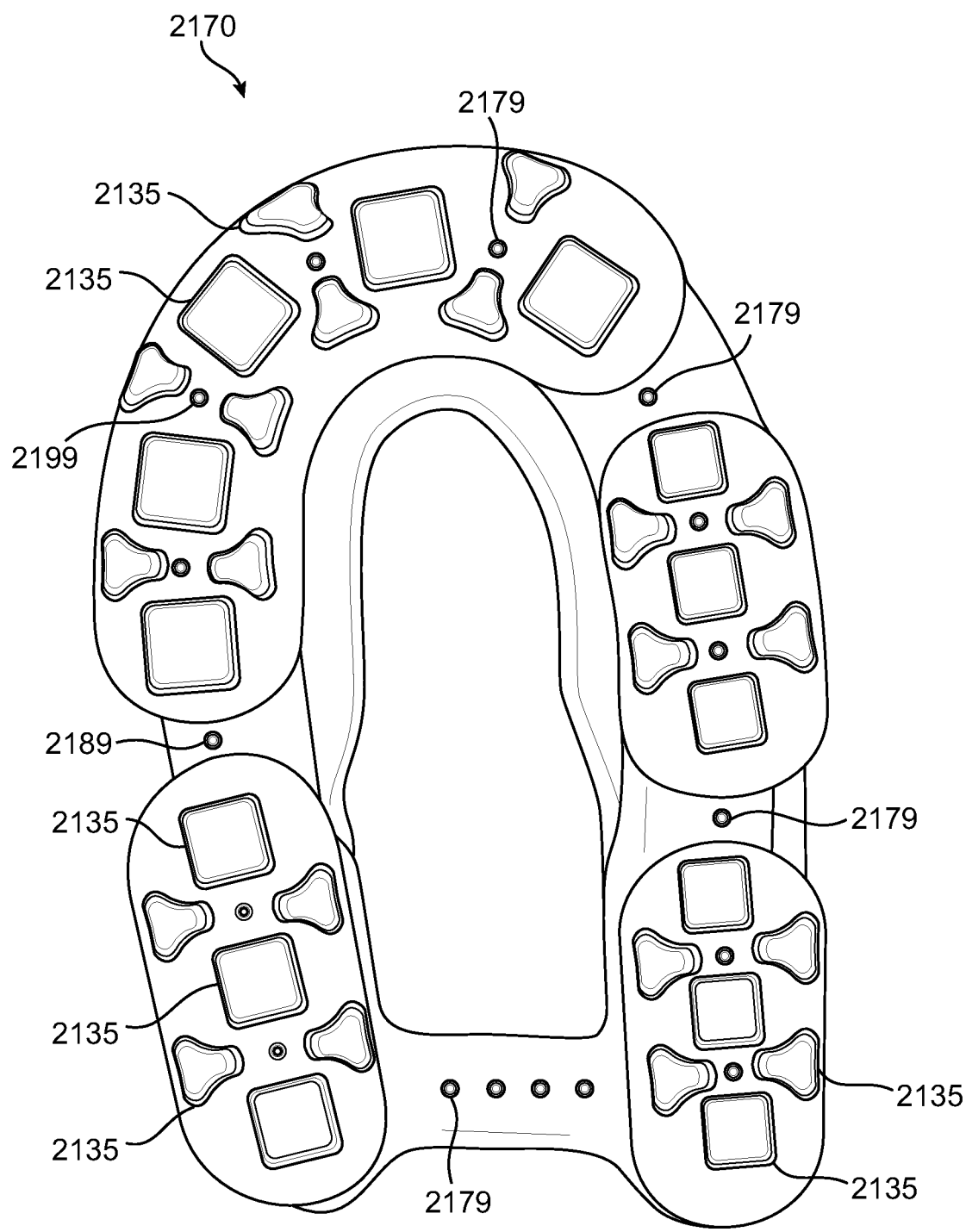
FIG. 21 is a bottom view of an embodiment of a heel outsole.
Figure 22:
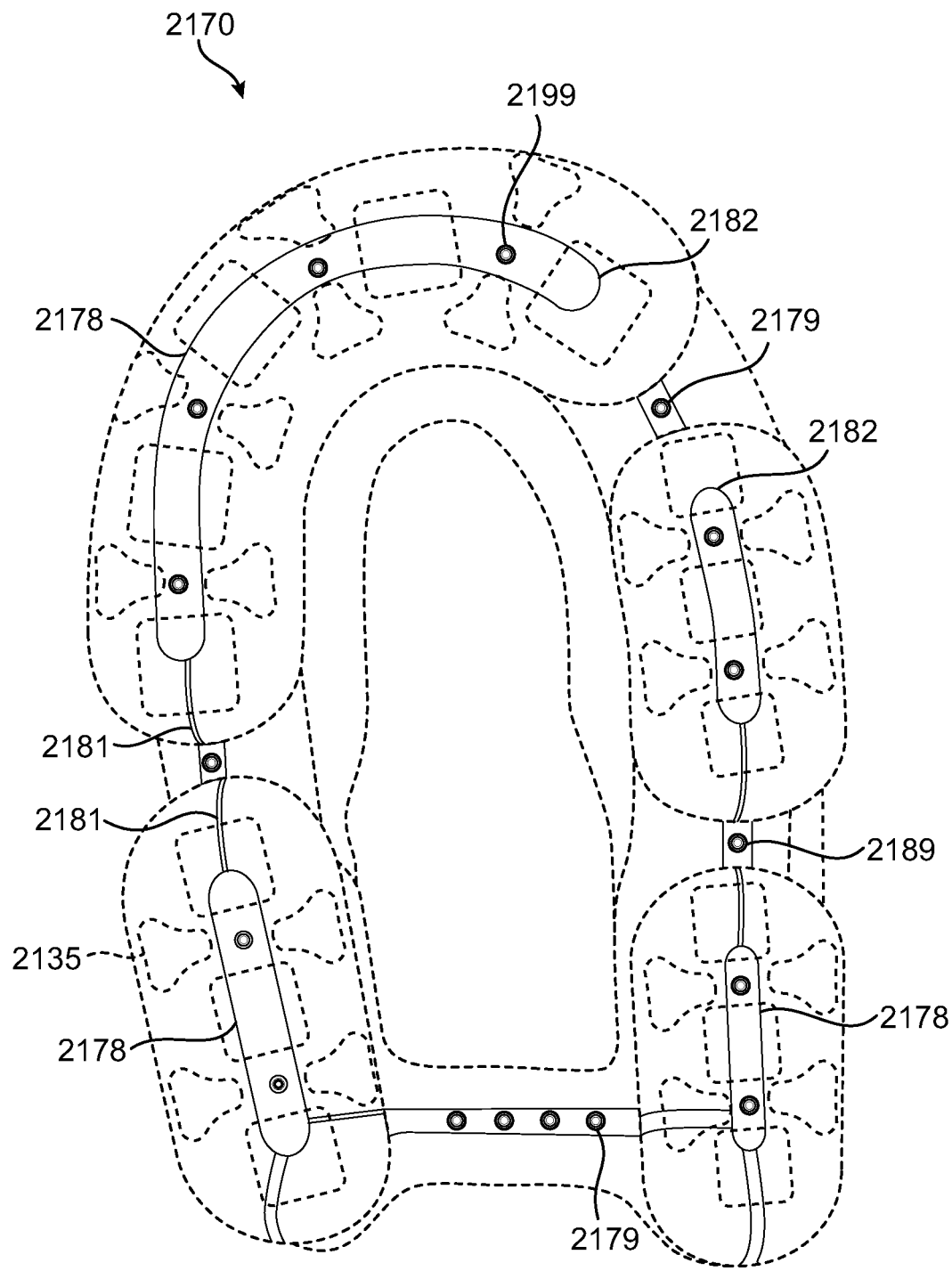
FIG. 22 is a bottom view of an embodiment of a heel outsole showing internal structure.
Figure 23:
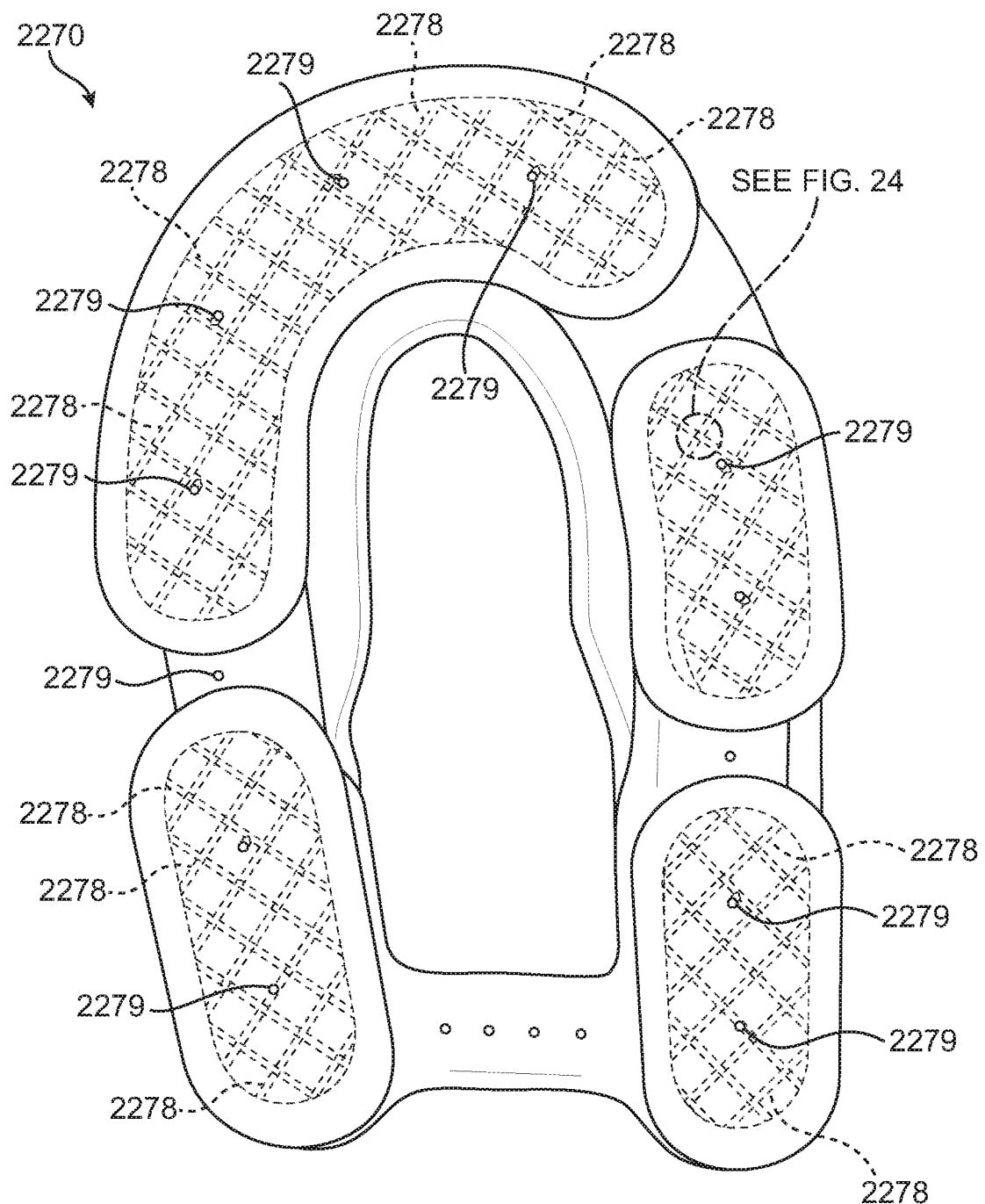
FIG. 23 is a bottom view of another embodiment of a heel outsole.
Figure 24:
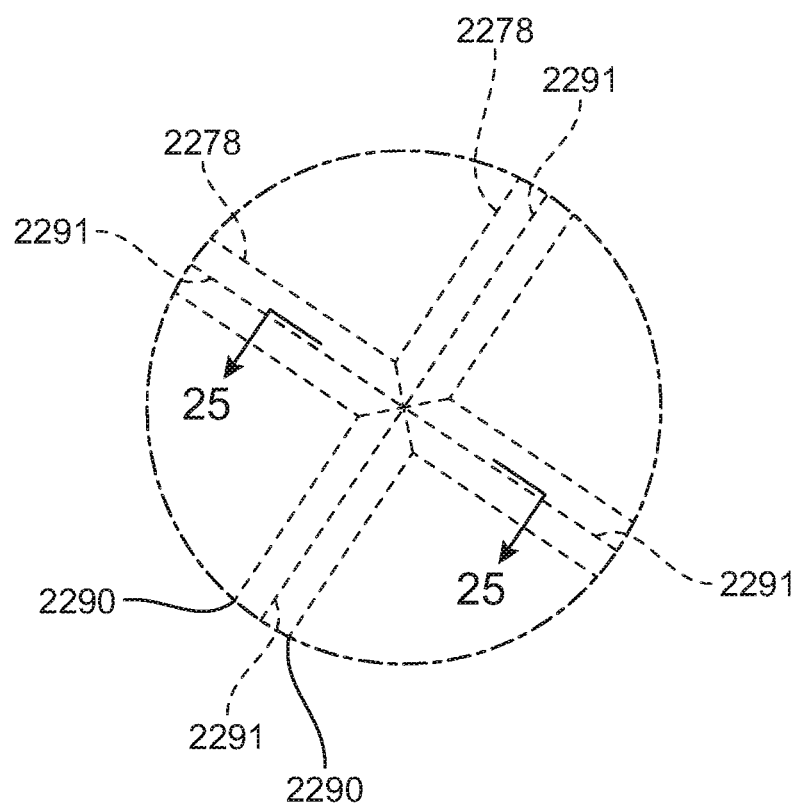
FIG. 24 is an enlarged view of a portion of FIG. 23.
Figure 25:
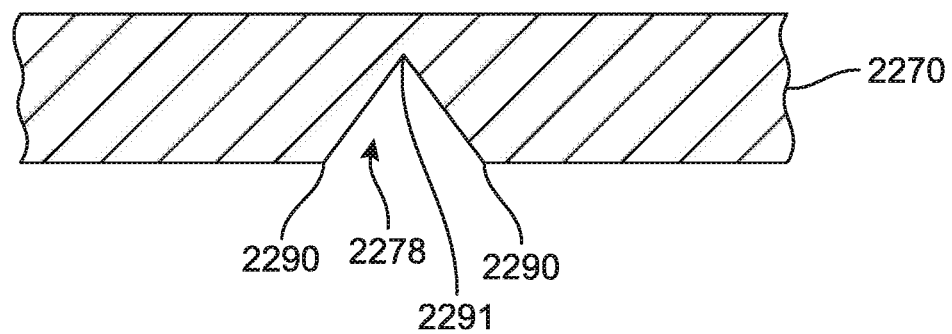
FIG. 25 is a cross-sectional view of a portion of FIG. 24.

FIG. 20, FIG. 21, FIG. 22, and FIG. 23 illustrate additional embodiments related to minimizing air inclusions between outsole portions and fluid-filled chamber lower surfaces. FIG. 20 is a bottom view of an article of footwear in accordance with some embodiments of the disclosure. FIG. 21 illustrates an embodiment of a heel outsole. FIG. 22 illustrates an interior structure for enhancing gas movement to a gas escape opening. FIG. 23 illustrates another embodiment of a heel outsole. These and other structures may be used to minimize air inclusions.

FIG. 20 illustrates sole structure 2130, which is secured to the lower end of an upper, such as upper 120 (FIG. 1). Sole structure 2130 is located under the foot and supports the foot. The primary elements of sole structure 2130 are a forefoot sole structure 2131 including a forefoot component 2140 and forefoot outsole portions 2060, and a heel sole structure including a heel component 2150 and a heel outsole 2070. In some embodiments, each of forefoot component 2140 and heel component 2150 may be directly secured to a lower area of the upper. Forefoot component 2140 and heel component 2150 are formed from a polymer material that encloses a fluid, which may be a gas, liquid, or gel. During walking and running, for example, forefoot component 2140 and heel component 2150 may compress between the foot and the ground, thereby attenuating ground reaction forces. That is, forefoot component 2140 and heel component 2150 are inflated and generally pressurized with the fluid to cushion the foot.

In some configurations, sole structure 2130 may include a foam layer, for example, that extends between upper 120 and one or both of forefoot component 2140 and heel component 2150, or a foam element may be located within indentations in the lower areas of forefoot component 2140 and heel component 2150. In other configurations, forefoot sole structure 2131 may incorporate plates, moderators, lasting elements, or motion control members that further attenuate forces, enhance stability, or influence the motions of the foot. Heel sole structure 2132 also may include such members to further attenuate forces, enhance stability, or influence the motions of the foot.

In addition to providing a wear surface in article of footwear 100, forefoot outsole 2060 and heel outsole 2070 may enhance various properties and characteristics of sole structure 2130. Properties and characteristics of the outsoles, such as the thickness, flexibility, the properties and characteristics of the material used to make the outsole, and stretch, may be varied or selected to modify or otherwise tune the cushioning response, compressibility, flexibility, and other properties and characteristics of sole structure 2130. Reinforcement of the outsole (for example, inclusion of structural elements, such as ribs), apertures, the height of the overlap, the number and location of the edges that overlap, or other features of an outsole all may be used to tune the responses of the sole structure. An outsole also may incorporate tread elements, such as protrusions, ridges, or ground-engaging lugs or sections, that impart traction. In some embodiments, an outsole may be replaced by a plate or other structural element. A plate may have features that assist with securing an outsole or other element to heel component 2150.

In particular, overlap of a portion of an outsole away from the ground-engaging portion and up the edge of a forefoot component or a heel component, such as described above and illustrated at least in FIG. 17, FIG. 18, and FIG. 19, may be used to tune the elastic response and cushioning response of the resultant sole structure. With the guidance provided herein, these and other properties and characteristics of the outsole may be considered by the user in combination with the properties and characteristics of the fluid-filled components of the components to adjust the responses of a sole structure.

Sole structure 2130 may be translucent or transparent, and may be colored or patterned for aesthetic appeal.

Forefoot outsole 2060 is secured to lower areas of forefoot component 2140. In some embodiments, forefoot sole structure 2131 may extend into a midfoot region. The forefoot outsole 2060 also may be secured to lower areas of forefoot component 2140 in a midfoot region. Heel outsole 2070 is secured to lower areas of heel component 2150. Both heel component 2150 and heel outsole 2070 may extend into a midfoot region. Forefoot outsole 2060 and heel outsole 2070 may be formed from a wear-resistant material. The wear-resistant material may be transparent or translucent to provide a visually appealing effect. The wear-resistant material may be textured on the ground-engaging portions to impart traction. In some embodiments, the wear-resistant material may have ground-engaging lugs or portions 2135, as illustrated in FIG. 20.

FIG. 20 also illustrates gas escape openings 2069 in forefoot outsole portions 2060 and gas escape openings 2079 in heel outsole portions 2070. These gas escape openings allow air or other gases trapped between a component and the corresponding outsole during assembly to escape. The inside surface of an outsole portion may be shaped in a manner that may accumulate trapped gas and direct the entrapped gas to a gas escape opening. For example, small passages, such as a small tunnel or removed area, may be formed on the inside surface of the outsole portion.

FIG. 21 and FIG. 22 illustrate an embodiment of a heel outsole. FIG. 21 illustrates an embodiment of such gas escaping openings 2179. These openings 2179 may be located on the bottom surface of heel outsole 2170 or forefoot outsole 2060. Some gas escape openings may be close to the ground-engaging surface, such as FIG. 21 through FIG. 25, whereas others may be located between ground-engaging portions, such as gas escape opening 2189. FIG. 21 also illustrates ground-engaging lugs 2135 and gas escape openings 2179.

FIG. 22 illustrates embodiments of gas escape passages and volumes on the inside surface of heel outsole 2170. FIG. 22 illustrates gas accumulation areas 2178 present in association with gas escape openings 2179. The gas accumulation areas 2178 and passages 2181 serve to reduce inclusions between the heel component and heel outsole 2170. Gas accumulation passages 2181 may connect gas escape openings 2189 to gas accumulation area 2178. As an illustration, each member of the gas accumulation system need not be connected to every other member. For example, gas accumulation area 2182 is not continuous with or connected to adjacent gas escape passage 2179.

FIG. 23 illustrates an embodiment wherein the gas accumulation passages 2278 are formed as a regular pattern on the inside surface of outsole 2270. Gas accumulation passages 2278 provide texture in outsole inside lower surface 2288, as illustrated in FIG. 23, in the enlarged view FIG. 24, and in FIG. 25. Gas accumulation passage 2278 is formed by high areas 2290 and low areas 2291. Low areas 2291 have a depth in outsole inside lower surface 2288. Gas escape openings 2279 are present in outsole 2270. Each of gas escape openings 2279 is in communication with a gas accumulation passage 2278. In some embodiments, each of the passages 2278 is associated with other passages, so gas accumulated in the pattern of gas accumulation passages 2278 may escape through a gas escape opening 2279. Thus, imperfections from captured gas bubbles may be minimizes for a clear, clean, unblemished appearance. In some embodiments, gas escape passages 2279 not located on a ground-engaging surface need not be associated with gas accumulation passages 2278.

Figure 26:
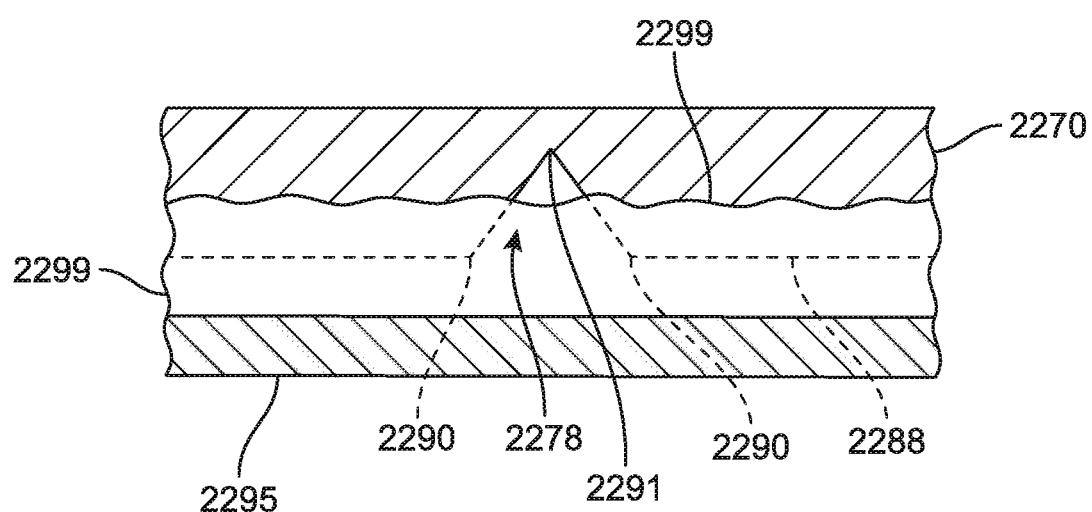
FIG. 26 is a cross-sectional view of a portion of a heel outsole adhered to a heel component.

FIG. 26 illustrates an embodiment wherein the thickness of the adhesive is less than the depth of the low area of the texture on the inside lower surface of the outsole. FIG. 26 illustrates a cross-section of a portion of outsole 2270 adhered by adhesive 2299 to component 2295. Adhesive 2299 has a thickness. As can be seen in FIG. 26, adhesive 2299 completely fills the region between outsole inside lower surface 2288 and component 2295, and extends into gas accumulation passage 2278, which has high areas 2290 and low areas 2291. However, adhesive 2299 has a thickness that is less than the low areas 2291 of gas accumulation passages 2278.

Although FIG. 21, FIG. 22, and FIG. 23 depict only heel-related objects, the principles expressed in each also may be applied to a forefoot section to produce a forefoot section similar to the heel-related disclosure herein. The skilled practitioner can readily determine how to extend the principles used to form a heel outsole to form a forefoot outsole.

While various embodiments of the invention have been described, the description is intended to be exemplary, rather than limiting and it will be apparent to those of ordinary skill in the art that many more embodiments and implementations are possible that are within the scope of the invention. For example, rather than a square or diamond-shaped texture on the interior of an outsole, another pattern, such as triangles, pentagons, or circles may be used. Accordingly, the invention is not to be restricted except in light of the attached claims and their equivalents. Also, various modifications and changes may be made within the scope of the attached claims.

What is claimed is:

1. A method of manufacturing a sole structure for an article of footwear, the method comprising:
    forming a fluid-filled segment to include a first portion extending along one of a medial side of the sole structure or a lateral side of the sole structure, a second portion extending from the first portion toward the other of the medial side or the lateral side, and a third portion extending from the first portion toward the other of the medial side or the lateral side, the fluid-filled segment having an upper surface, a lower surface, and an edge extending between the upper surface and the lower surface;
    forming an outsole having a compartment that corresponds to the fluid-filled segment and includes a ground-engaging surface and a segment-engaging surface formed on an opposite side of the outsole than the ground-engaging surface, the segment-engaging surface including a series of lands and grooves, the grooves including high areas and low areas; and
    bonding the lands to the lower surface of the fluid-filled segment to space the grooves apart from the lower surface of the fluid-filled segment using an adhesive, where a thickness of the adhesive is less than a thickness between the fluid-filled segment and the low areas of the grooves.

2. The method of claim 1, further comprising extending a portion of the outsole onto the edge of the fluid-filled segment.

3. The method of claim 2, further comprising bonding the lands to the edge of the fluid-filled segment.

4. The method of claim 1, further comprising providing at least one of (i) the second portion with a distal end that terminates between the lateral side and the medial side and (ii) the third portion with a distal end that terminates between the lateral side and the medial side.

5. The method of claim 1, further comprising forming a second fluid-filled segment to include a fourth portion extending along the other of the medial side and the lateral side, a fifth portion extending from the fourth portion toward the one of the medial side and the lateral side and having a distal end that terminates between the lateral side and the medial side, and a sixth portion extending from the fourth portion toward the one of the medial side and the lateral side and having a distal end that terminates between the lateral side and the medial side.

6. The method of claim 5, further comprising aligning the second portion with the fifth portion across the sole structure in a direction extending between the medial side and the lateral side and aligning the third portion with the sixth portion across the sole structure in the direction extending between the medial side and the lateral side.

7. The method of claim 1, wherein forming the outsole to include the segment-engaging surface having the series of lands and grooves includes providing the series of lands and grooves having a regularly repeating pattern.

8. The method of claim 1, wherein forming the outsole to include the segment-engaging surface having the series of lands and grooves includes providing the series of lands having a square shape or a diamond shape.

9. The method of claim 1, wherein forming the fluid-filled segment includes forming the fluid-filled segment into a C-shape.

10. A method of manufacturing a sole structure for an article of footwear, the method comprising:
    forming a fluid-filled segment to include a first portion extending along one of a medial side of the sole structure or a lateral side of the sole structure, a second portion extending from the first portion toward the other of the medial side or the lateral side, and a third portion extending from the first portion toward the other of the medial side or the lateral side, the fluid-filled segment having an upper surface, a lower surface, and an edge extending between the upper surface and the lower surface;
    forming an outsole having a compartment that corresponds to the fluid-filled segment and includes a ground-engaging surface and a segment-engaging surface formed on an opposite side of the outsole than the ground-engaging surface, the segment-engaging surface including a series of projections defining a series of recesses, the recesses including high areas and low areas; and
    bonding the projections to the lower surface of the fluid-filled segment to space the recesses apart from the lower surface of the fluid-filled segment using an adhesive, where a thickness of the adhesive is less than a thickness between the fluid-filled segment and the low areas of the recesses.

11. The method of claim 10, further comprising extending a portion of the outsole onto the edge of the fluid-filled segment.

12. The method of claim 11, further comprising bonding the projections to the edge of the fluid-filled segment.

13. The method of claim 10, further comprising providing at least one of (i) the second portion with a distal end that terminates between the lateral side and the medial side and (ii) the third portion with a distal end that terminates between the lateral side and the medial side.

14. The method of claim 10, further comprising forming a second fluid-filled segment to include a fourth portion extending along the other of the medial side and the lateral side, a fifth portion extending from the fourth portion toward the one of the medial side and the lateral side and having a distal end that terminates between the lateral side and the medial side, and a sixth portion extending from the fourth portion toward the one of the medial side and the lateral side and having a distal end that terminates between the lateral side and the medial side.

15. The method of claim 14, further comprising aligning the second portion with the fifth portion across the sole structure in a direction extending between the medial side and the lateral side and aligning the third portion with the sixth portion across the sole structure in the direction extending between the medial side and the lateral side.

16. The method of claim 10, wherein forming the outsole to include the segment-engaging surface having the series of projections and recesses includes providing the series of projections and recesses having a regularly repeating pattern.

17. The method of claim 10, wherein forming the outsole to include the segment-engaging surface having the series of projections and recesses includes providing the series of projections having a square shape or a diamond shape.

18. The method of claim 10, wherein forming the fluid-filled segment includes forming the fluid-filled segment into a C-shape.

\* \* \* \* \*